United States Patent
Saito et al.

(10) Patent No.: US 10,131,720 B2
(45) Date of Patent: Nov. 20, 2018

(54) METHOD FOR PRODUCING FLUORINATED POLYMER PARTICLES

(71) Applicant: Asahi Glass Company, Limited, Chiyoda-ku (JP)

(72) Inventors: Susumu Saito, Chiyoda-ku (JP); Wakako Hashimoto, Chiyoda-ku (JP); Tetsuji Shimohira, Chiyoda-ku (JP); Kazuo Hamazaki, Chiyoda-ku (JP); Satoshi Otsugu, Chiyoda-ku (JP); Hiroki Matoba, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/628,672

(22) Filed: Jun. 21, 2017

(65) Prior Publication Data

US 2017/0283523 A1    Oct. 5, 2017

Related U.S. Application Data

(63) Continuation of application No. PCT/JP2015/085560, filed on Dec. 18, 2015.

(30) Foreign Application Priority Data

Dec. 25, 2014  (JP) ................................ 2014-262599

(51) Int. Cl.
    *C08F 6/12*      (2006.01)
    *C08F 6/00*      (2006.01)
    *C08F 2/06*      (2006.01)
    *C08J 3/16*      (2006.01)
    *C08L 27/12*     (2006.01)

(52) U.S. Cl.
    CPC .................. *C08F 6/12* (2013.01); *C08F 2/06* (2013.01); *C08F 6/003* (2013.01); *C08J 3/16* (2013.01); *C08L 27/12* (2013.01)

(58) Field of Classification Search
    CPC .... C08F 6/12; C08F 2/06; C08F 6/003; C08L 27/12; C08J 3/16
    See application file for complete search history.

(56) References Cited

U.S. PATENT DOCUMENTS

| | | | | |
|---|---|---|---|---|
| 2009/0227749 | A1* | 9/2009 | Tayanagi | ............... C08F 214/18 526/214 |
| 2010/0048956 | A1* | 2/2010 | Isaka | ....................... C08F 6/003 568/32 |
| 2010/0160598 | A1* | 6/2010 | Saito | ....................... C08F 6/001 528/373 |
| 2015/0183946 | A1* | 7/2015 | Saito | ......................... C08J 5/22 521/27 |

FOREIGN PATENT DOCUMENTS

| | | |
|---|---|---|
| JP | 11-35626 | 2/1999 |
| JP | 2002-260705 | 9/2002 |
| JP | 2009-209365 | 9/2009 |
| WO | WO 2008/069301 A1 | 6/2008 |
| WO | WO 2010/073940 A1 | 7/2010 |
| WO | WO 2014/069165 A1 | 5/2014 |

OTHER PUBLICATIONS

International Search Report dated Mar. 22, 2016 in PCT/JP2015/085560, filed on Dec. 18, 2015.

* cited by examiner

*Primary Examiner* — Robert D. Harlan
(74) *Attorney, Agent, or Firm* — Oblon, McClelland, Maier & Neustadt, L.L.P.

(57) ABSTRACT

A method for producing particles of a fluorinated polymer (A) which has either one or both of structural units (u1) derived from tetrafluoroethylene and structural units (u2) having no sulfonic acid type functional group and having a cyclic structure and fluorine atoms, and which has structural units (u3) having a sulfonic acid type functional group, wherein the proportion of the structural units (u1) is from 0 to 82 mol % in all structural units in the fluorinated polymer (A), the method including:
  (i) preparing solution or dispersion of the fluorinated polymer (A) having the fluorinated polymer (A) dissolved or dispersed in a solvent (B); and
  (ii) mixing the solution or dispersion of the fluorinated polymer (A) and a solvent (C) to aggregate the fluorinated polymer (A) to form particles of the fluorinated polymer (A).

17 Claims, No Drawings

METHOD FOR PRODUCING FLUORINATED POLYMER PARTICLES

TECHNICAL FIELD

The present invention relates to a method for producing fluorinated polymer particles.

BACKGROUND ART

A fluorinated polymer having sulfonic acid type functional groups is widely used for diaphragms (e.g. for alkaline electrolysis, for electrodialysis, for various organic electrolytic syntheses, etc.), and the fluorinated polymer having sulfonic acid type functional groups, is usually a fluorinated polymer having structural units derived from tetrafluoroethylene and structural units having sulfonic acid type functional groups, wherein the proportion of structural units derived from tetrafluoroethylene is approximately from 85 to 90 mol % in all structural units (100 mol %) in the fluorinated polymer (hereinafter referred to also as a fluorinated polymer (X)).

The fluorinated polymer (X) is obtainable in the form of particles of the fluorinated polymer (X), by obtaining solution or dispersion of the fluorinated polymer (X) by means of a solution polymerization method, and then aggregating the fluorinated polymer from the solution or dispersion of the fluorinated polymer (X).

However, if fine particles are formed in a large amount during aggregation of the fluorinated polymer (X) from the solution or dispersion of the fluorinated polymer (X), it would be difficult to separate particles of the fluorinated polymer (X) by filtration and to recover an unreacted monomer.

As a method for producing fluorinated polymer particles while sufficiently suppressing formation of fine particles, the following method has been proposed.

A method wherein, a fluorinated polymer is dissolved or dispersed in a specific good solvent whereby the degree of swelling of the fluorinated polymer is within a specific range, thereby to prepare solution or dispersion of the polymer, then the solution or dispersion of the fluorinated polymer and a specific poor solvent whereby the degree of swelling of the fluorinated polymer is within a specific range, are mixed in such a proportion that the degree of swelling of the fluorinated polymer would be within a specific range by a mixed solvent of the good solvent and the poor solvent, whereby the fluorinated polymer is aggregated to form fluorinated polymer particles (Patent Document 1).

Meanwhile, recently, (1) high cell output (high ion exchange capacity) and (2) high heat resistance (high softening temperature) are required for a fluorinated polymer having sulfonic acid type functional groups to be used for polymer electrolyte membranes, catalyst layers, etc. of fuel cells.

For (1), there is a tendency to reduce the proportion of structural units derived from tetrafluoroethylene and to increase structural units having sulfonic acid type functional groups, in the fluorinated polymer.

For (2), it has been proposed to reduce the proportion of structural units derived from tetrafluoroethylene and to introduce structural units having a cyclic structure and fluorine atoms anew, in the fluorinated polymer (Patent Document 2).

However, in the case of a fluorinated polymer wherein the proportion of structural units having sulfonic acid type functional groups or the proportion of structural units having a cyclic structure and fluorine atoms is increased, while reducing the proportion of the structural units derived from tetrafluoroethylene (hereinafter referred to also as a fluorinated polymer (A)), the solubility of the fluorinated polymer (A) in a good solvent tends to be high. Therefore, the fluorinated polymer (A) will be dissolved in a good solvent without being swollen by the good solvent, i.e. it will not be possible to obtain the degree of swelling of the fluorinated polymer (A) by the good solvent. If it is not possible to obtain the degree of swelling of the fluorinated polymer (A) by a good solvent, it is not possible to apply the production method as described in Patent Document 1 to such fluorinated polymer (A).

Further, at the time of aggregating the fluorinated polymer (A) from the solution or dispersion of the fluorinated polymer (A), fine particles are likely to be formed in a large amount, or particles of the fluorinated polymer (A) are likely to adhere to one another to form large aggregates.

PRIOR ART DOCUMENTS

Patent Documents

Patent Document 1: WO2010/073940
Patent Document 2: JP-A-2002-260705

DISCLOSURE OF INVENTION

Technical Problem

The present invention is to provide a method whereby it is possible to produce fluorinated polymer particles having formation of fine particles or formation of large aggregates sufficiently suppressed, even in the case of a fluorinated polymer having sulfonic acid type functional groups and having a reduced proportion of structural units derived from tetrafluoroethylene.

Solution to Problem

The present invention has the following embodiments.
[1] A method for producing fluorinated polymer particles comprising the following steps (i) and (ii), being a method for producing particles of a fluorinated polymer (A) which has either one or both of structural units (u1) derived from tetrafluoroethylene and structural units (u2) having no sulfonic acid type functional group and having a cyclic structure and fluorine atoms, and which has structural units (u3) having a sulfonic acid type functional group, wherein the proportion of the structural units (u1) is from 0 to 82 mol % in all structural units (100 mol %) in the fluorinated polymer (A):

(i) a step of preparing solution or dispersion of the fluorinated polymer (A) having the above fluorinated polymer (A) dissolved or dispersed in a solvent (B), wherein the following conditions (i-1) and (i-2) are satisfied:

(i-1) the solvent (B) contains a good solvent (B2) wherein the solubility of the fluorinated polymer (A) is at least 30%, (i-2) even when the above solution or dispersion of the fluorinated polymer (A) is passed through a filter of 200 mesh made of stainless steel, no residue remains on the filter, (ii) a step of mixing the above solution or dispersion of the fluorinated polymer (A) and a solvent (C) to aggregate the fluorinated polymer (A) to form particles of the fluorinated polymer (A), wherein the following conditions (ii-1) to (ii-3) are satisfied:

(ii-1) the solvent (C) contains a poor solvent (C1) whereby the degree of swelling of the fluorinated polymer (A) is at most 100%, (ii-2) the degree of swelling of the fluorinated polymer (A) by a mixed solvent (BC) of the solvent (B) and the solvent (C) is from 70 to 250%, (ii-3) the ratio ($W_C/W_B$) of the mass ($W_C$) of the solvent (C) to the mass ($W_B$) of the solvent (B) is from 1 to 5.

[2] The method for producing fluorinated polymer particles according to [1], wherein the degree of swelling of the fluorinated polymer (A) by the solvent (BC) is from 80 to 250%.

[3] The method for producing fluorinated polymer particles according to [1], wherein the degree of swelling of the fluorinated polymer (A) by the solvent (BC) is from 105 to 250%.

[4] The method for producing fluorinated polymer particles according to any one of [1] to [3], wherein the good solvent (B2) is a hydrofluorocarbon.

[5] The method for producing fluorinated polymer particles according to any one of [1] to [4], wherein the good solvent (B2) is either one or both of $C_6F_{13}H$ and $CF_3CFHCFHCF_2CF_3$.

[6] The method for producing fluorinated polymer particles according to any one of [1] to [5], wherein the poor solvent (C1) is at least one member selected from hydrofluoroethers, hydrofluorocarbons, non-fluorinated alcohols, hydrocarbons and fluorinated alcohols.

[7] The method for producing fluorinated polymer particles according to any one of [1] to [6], wherein the poor solvent (C1) is at least one member selected from $CF_3CH_2OCF_2CF_2H$, $CHF_2CH_2CF_3$, $CF_3CH_2CF_2CH_3$, methanol, hexane, $CF_3CF_2CH_2OH$, $CF_3CH_2OH$ and $H(CF_2)_4CH_2OH$.

[8] The method for producing fluorinated polymer particles according to any one of [1] to [7], wherein the poor solvent (C1) is at least two members selected from hydrofluoroethers, hydrofluorocarbons, non-fluorinated alcohols, hydrocarbons and fluorinated alcohols.

[9] The method for producing fluorinated polymer particles according to any one of [1] to [8], wherein the degree of swelling of the fluorinated polymer (A) by the solvent (BC), is adjusted by the mixing ratio of at least two members of the poor solvent (C1).

[10] The method for producing fluorinated polymer particles according to any one of [1] to [9], wherein the degree of swelling of the fluorinated polymer (A) by the solvent (BC), is adjusted by the temperature of the solvent (C) immediately before mixing it with the solution or dispersion of the fluorinated polymer (A) in the step (ii).

[11] The method for producing fluorinated polymer particles according to any one of [1] to [10], wherein the temperature of the solvent (C) immediately before mixing it with the solution or dispersion of the fluorinated polymer (A) in the step (ii) is within a range of from −15 to 30° C.

[12] The method for producing fluorinated polymer particles according to any one of [1] to [11], wherein in all structural units (100 mol %) in the fluorinated polymer (A), the proportion of the structural units (u1) is from 35 to 82 mol %, the proportion of the structural units (u2) is at least 0 mol % and less than 30 mol %, and the proportion of the structural units (u3) is from 18 to 35 mol %.

[13] The method for producing fluorinated polymer particles according to [12], wherein the degree of swelling of the fluorinated polymer (A) by the solvent (BC) is from 70 to 200%.

[14] The method for producing fluorinated polymer particles according to any one of [1] to [11], wherein in all structural units (100 mol %) in the fluorinated polymer (A), the proportion of the structural units (u1) is from 0 to 60 mol %, the proportion of the structural units (u2) is from 20 to 85 mol %, and the proportion of the structural units (u3) is from 10 to 35 mol %.

[15] The method for producing fluorinated polymer particles according to [14], wherein the degree of swelling of the fluorinated polymer (A) by the solvent (BC) is from 105 to 250%.

[16] The method for producing fluorinated polymer particles according to any one of [1] to [15], wherein following the steps (i) and (ii), the fluorinated polymer (A) is separated and recovered.

[17] The method for producing fluorinated polymer particles according to any one of [1] to [16], wherein the ion-exchange capacity of a polymer having the sulfonic acid type functional groups of the fluorinated polymer (A) converted to ion exchange groups, is from 0.9 to 2.5 meq/g dry resin.

Advantageous Effects of Invention

According to the method for producing fluorinated polymer particles of the present invention, even in the case of a fluorinated polymer having sulfonic acid type functional groups and having a reduced proportion of structural units derived from tetrafluoroethylene, it is possible to sufficiently suppress formation of fine particles or formation of large aggregates, and separation and recovery of the fluorinated polymer particles by filtration, and recovery of an unreacted monomer become easy.

This is accomplished in the production method of the present invention by controlling the solubility before aggregation of the fluorinated polymer (A) to satisfy conditions (i-1) and (i-2) and controlling the degree of swelling after aggregation of the fluorinated polymer (A) to satisfy the conditions (ii-1) to (ii-3).

DESCRIPTION OF EMBODIMENTS

In this specification, structural units represented by the formula (u1) will be referred to as structural units (u1). The same applies to structural units represented by other formulae.

Further, a monomer represented by the formula (m1) will be referred to as a monomer (m1). The same applies to monomers represented by other formulae.

The following definitions of terms apply to this specification and claims.

A "fluorinated polymer" means a polymer having some of or all hydrogen atoms bonded to a carbon atom, substituted by a fluorine atom.

"Structural units" means units derived from a monomer, formed by polymerizing the monomer. The structural units may be units directly formed by the polymerization reaction of the monomer, or may be units having part of the units converted to another structure by treating the polymer.

A "sulfonic acid type functional group" means a sulfonic acid group (—$SO_3^-H^+$), a salt thereof (—$SO_3^-M^+$ (wherein $M^+$ is a monovalent metal ion, or an ammonium ion in which at least one hydrogen atom may be substituted by a hydrocarbon group)) or a group (—$SO_2F$, —$SO_2Cl$, —$SO_2Br$, etc.) to be hydrolyzed to become a sulfonic acid group or a salt thereof.

A "hydrocarbon" means a compound consisting solely of hydrogen and carbon atoms.

A "hydrofluorocarbon (HFC)" means a compound having at least one hydrogen atom substituted by a fluorine atom, in a hydrocarbon.

A "hydrofluoroether (HFE)" means a compound having an etheric oxygen atom between carbon atoms in a hydrofluorocarbon.

A "fluorinated alcohol" means an alcohol having at least one hydrogen atom bonded to a carbon atom, substituted by a fluorine atom.

The solubility of a fluorinated polymer (A) in each solvent is obtained by the following procedures (I) to (IV).

(I) The same fluorinated polymer as the fluorinated polymer (A) in steps (i) and (ii), is dried and heat-pressed to obtain a film having a thickness of 100 μm. From the film, a sample of 20 mm×20 mm is cut out, and the mass ($W_1$) of the sample is measured.

(II) In 50 g of the same solvent (hereinafter referred to as the simulated solvent) as a poor solvent (B1), a good solvent (B2), a poor solvent (C1) or a good solvent (C2) in steps (i) and (ii), the above sample is immersed for 16 hours at 25° C. and under a closed environment.

(III) By using a polypropylene filter with a sieve opening of 113 μm, filtration is carried out, then the sample on the filter is discarded, and the filtrate is dried for 6 hours at 80° C. and vacuum-dried for 16 hours at 120° C., whereupon the mass ($W_2$) of the sample is measured.

(IV) The solubility is obtained from the following formula (1).

$$\text{Solubility (\%)} = W_2/W_1 \times 100 \quad (1)$$

The degree of swelling of a fluorinated polymer (A) by each solvent is obtained by the following procedures (I) to (IV).

(I) The same fluorinated polymer as the fluorinated polymer (A) in steps (i) and (ii), is dried and heat-pressed to obtain a film having a thickness of 100 μm. From the film, a sample of 20 mm×20 mm is cut out, and the dry mass ($W_{A1}$) of the sample is measured.

(II) In 50 g of the same solvent or mixed solvent (hereinafter referred to as the simulated solvent) as a poor solvent (B1), a good solvent (B2), a poor solvent (C1), a good solvent (C2) or a mixed solvent (BC) in steps (i) and (ii), the above sample is immersed for 16 hours at the temperature of the solvent (C) immediately before mixing it with solution or dispersion of the fluorinated polymer (A) in step (ii), and under a closed environment.

(III) The sample is taken out from the simulated solvent, and after quickly wiping off the simulated solvent, the mass ($W_{A2}$) of the swollen sample is measured.

(IV) The degree of swelling is obtained from the following formula (2).

$$\text{Degree of swelling (\%)} = (W_{A2} - W_{A1})/W_{A1} \times 100 \quad (2)$$

The "same fluorinated polymer as the fluorinated polymer (A)" means that the type of structural units derived from monomer(s), the composition ratio thereof and the molecular weight are all the same. Such a fluorinated polymer may, for example, be obtained by sampling a part of solution of the fluorinated polymer (A) obtained by a solution polymerization method, and recovering the fluorinated polymer (A) from the solution.

The "same simulated solvent as a poor solvent (B1), a good solvent (B2), a poor solvent (C1), a solvent (B) or a mixed solvent (BC)" means that the type of the solvent(s) and the composition ratio thereof are the same.

<Method for Producing Fluorinated Polymer Particles>

The method for producing fluorinated polymer particles of the present invention has the following steps.

(i) a step of preparing solution or dispersion of the fluorinated polymer (A) having the fluorinated polymer (A) dissolved or dispersed in a solvent (B).

(ii) a step of mixing the solution or dispersion of the fluorinated polymer (A) and a solvent (C), to aggregate the fluorinated polymer (A) to form particles of the fluorinated polymer (A).

(iii) As the case requires, a step of separating and recovering the particles of the fluorinated polymer (A) by such a means as filtration, centrifugal separation, decantation, etc.

(Step (i))

In the step (i), it is necessary to satisfy the following conditions (i-1) and (i-2):

(i-1) the solvent (B) contains a good solvent (B2) wherein the solubility of the fluorinated polymer (A) is at least 30%, and (i-2) even when the solution or dispersion of the fluorinated polymer (A) is passed through a filter of 200 mesh made of stainless steel (SUS), no residue remains on the filter.

Condition (i-1):

"The solubility of the fluorinated polymer (A) by the good solvent (B2) is at least 30%" means that the fluorinated polymer (A) will be dissolved in the good solvent (B2) without being swollen by the good solvent (B2), i.e. it will not be possible to obtain the degree of swelling of the fluorinated polymer (A) by the good solvent (B2). The production method of the present invention is a method directed to the fluorinated polymer (A) to which the production method disclosed in Patent Document 1 is not applicable since it is impossible to obtain the degree of swelling of the fluorinated polymer (A) by the good solvent (B2).

The good solvent (B2) contained in the solvent (B) is preferably at least 0.1 mass %, more preferably from 1 to 90 mass %. If the solvent (B) contains no good solvent (B2), it is difficult to satisfy the condition (i-2).

The good solvent (B2) is preferably HFC having at least six fluorine atoms in view of good solubility of the fluorinated polymer (A). As HFC having at least six fluorine atoms, $C_4F_9C_2H_5$, $C_6F_{13}CH_2CH_3$, $C_8F_{17}C_2H_5$, $C_6F_{13}H$, $HC_6F_{12}H$, $HC_4F_8H$, $C_6F_{14}$, $C_7F_{16}$, $CF_3CFHCFHCF_2CF_3$ or $(CF_3)_2CFCFHCFHCF_3$ may, for example, be mentioned, and in view of availability, cost, boiling point and separation and recovery, either one or both of $C_6F_{13}H$ and $CF_3CFHCFHCF_2CF_3$ is preferred. As the good solvent (B2), one type may be used alone, or at least two types may be used in combination.

The solvent (B) may contain a poor solvent (B1) whereby the degree of swelling of the fluorinated polymer (A) is at most 100%, as long as the condition (i-2) is satisfied. The poor solvent (B1) contained in the solvent (B) is preferably from 0 to 70 mass %, more preferably from 0 to 50 mass %. When the solvent (B) contains the poor solvent (B1), even if a temperature of the solvent (C) immediately before mixing it with solution or dispersion of the fluorinated polymer (A) in the step (ii) is relatively high, the fluorinated polymer (A) tends to readily aggregate and thereby to readily form particles of the fluorinated polymer (A) having a proper particle size. Further, it is possible to save energy for cooling the solvent (C) in the step (ii).

The poor solvent (B1) is preferably at least one member selected from HFE, HFC having at most five fluorine atoms, non-fluorinated alcohols, hydrocarbons and fluorinated alcohols, from the viewpoint of low degree of swelling of the fluorinated polymer (A).

HFE may, for example, be $CF_3CH_2OCF_2CF_2H$, $C_4F_9OCH_3$, $C_4F_9OC_2H_5$, $CF_3CF_2CF_2OCH_3$ and $(CF_3)_2CFOCH_3$.

HFC having at most five fluorine atoms may, for example, be $CHF_2CH_2CF_3$, $CF_3CH_2CF_2CH_3$ and $F_3C—C(F)=CH_2$.

Non-fluorinated alcohols may, for example, be methanol, ethanol, 1-propanol, isopropanol, n-butanol, 2-butanol and t-butanol.

Hydrocarbons may, for example, be cyclopentane, hexane, cyclohexane and heptane.

Fluorinated alcohols may, for example, be $CF_3CF_2CH_2OH$, $CF_3CH_2OH$ and $H(CF_2)_4CH_2OH$.

Another poor solvent (B1) may, for example, be acetone, acetonitrile, 1,2-dimethoxyethane or tetrahydrofuran.

The poor solvent (B1) is more preferably at least one member selected from $CF_3CH_2OCF_2CF_2H$, $CHF_2CH_2CF_3$, $CF_3CH_2CF_2CH_3$, methanol, hexane, $CF_3CF_2CH_2OH$, $CF_3CH_2OH$ and $H(CF_2)_4CH_2OH$ in view of availability, cost, boiling point, and separation and recovery. As the poor solvent (B1), one type may be used alone, or at least two types may be used in combination.

Further, in a case where the solution or dispersion of the fluorinated polymer (A) is based on fluid containing the fluorinated polymer (A) obtained by solution polymerization, bulk polymerization, suspension polymerization or emulsion polymerization, an unreacted monomer contained in the fluid is included in the solvent (B).

Condition (i-2):

"Even when the solution or dispersion of the fluorinated polymer (A) is passed through a filter of 200 mesh made of SUS, no residue remains on the filter" means that the fluorinated polymer (A) is completely dissolved in the solvent (B), or even though undissolved fluorinated polymer (A) remains, such a polymer is finely dispersed so as to be in a state close to solution, and means that the increase of mesh weight after drying is less than 0.1 mass % of all the polymer. The production method of the present invention is a method directed to the fluorinated polymer (A) to which the production method disclosed in Patent Document 1 is not applicable because of high solubility in the solvent (B).

In a case where a residue remains on a filter of 200 mesh made of SUS when the solution or dispersion of the fluorinated polymer (A) is passed through the filter, a solvent (B) in which the fluorinated polymer (A) is hardly dissolved is used. Therefore, at the time of mixing the solution or dispersion of the fluorinated polymer (A) and the solvent (C) in the step (ii), even a component having extremely high solubility, that is a component having high adhesion, is also precipitated, whereby particles of the fluorinated polymer (A) adhere to each other to readily form a single large aggregate.

Preparation method of solution or dispersion of fluorinated polymer (A):

A method for preparing solution or dispersion of the fluorinated polymer (A) may, for example, be the following method.

A method wherein fluid containing the fluorinated polymer (A) is obtained by solution polymerization using the good solvent (B2), and then the fluid is diluted with either one or both of the poor solvent (B1) and the good solvent (B2), within a range to satisfy the condition (ii-2).

In such a method, the solvent (B) is a mixture of the good solvent (B2) used in the solution polymerization, either one or both of the poor solvent (B1) and the good solvent (B2) used for dilution, and an unreacted monomer.

(Step (ii))

In the step (ii), it is necessary to satisfy the following conditions (ii-1) to (ii-3).

(ii-1) The solvent (C) contains a poor solvent (C1) whereby the degree of swelling of the fluorinated polymer (A) is at most 100%.

(ii-2) The degree of swelling of the fluorinated polymer (A) by a mixed solvent (BC) of the solvent (B) and the solvent (C) is from 70 to 250%, and (ii-3) The ratio $(W_C/W_B)$ of the mass $(W_C)$ of the solvent (C) to the mass $(W_B)$ of the solvent (B) is from 1 to 5.

Condition (ii-1):

The poor solvent (C1) is such that the degree of swelling of the fluorinated polymer (A) is preferably at most 100%, more preferably from 0 to 95%. If the solvent (C) contains no poor solvent (C1), it is difficult to satisfy the condition (ii-2).

The poor solvent (C1) is preferably at least one member selected from HFE, HFC having at most five fluorine atoms, non-fluorinated alcohols, hydrocarbons and fluorinated alcohols.

HFE may, for example, be $CF_3CH_2OCF_2CF_2H$, $C_4F_9OCH_3$, $C_4F_9OC_2H_5$, $CF_3CF_2CF_2OCH_3$ and $(CF_3)_2CFOCH_3$.

HFC having at most five fluorine atoms may, for example, be $CHF_2CH_2CF_3$, $CF_3CH_2CF_2CH_3$ and $F_3C—C(F)=CH_2$.

Non-fluorinated alcohols may, for example, be methanol, ethanol, 1-propanol, isopropanol, n-butanol, 2-butanol and t-butanol.

Hydrocarbons may, for example, be cyclopentane, hexane, cyclohexane and heptane.

Fluorinated alcohols may, for example, be $CF_3CF_2CH_2OH$, $CF_3CH_2OH$ and $H(CF_2)_4CH_2OH$.

Another poor solvent (C1) may, for example, be acetone, acetonitrile, 1,2-dimethoxyethane or tetrahydrofuran.

The poor solvent (C1) is preferably at least one member selected from $CF_3CH_2OCF_2CF_2H$, $CHF_2CH_2CF_3$, $CF_3CH_2CF_2CH_3$, methanol, hexane, $CF_3CF_2CH_2OH$, $CF_3CH_2OH$ and $H(CF_2)_4CH_2OH$, in view of availability, cost, boiling point, and separation and recovery, more preferably $CF_3CH_2OCF_2CF_2H$ or methanol with a view to sufficiently exhibiting the effects of the present invention. As the poor solvent (C1), one type may be used alone, or at least two types may be used in combination.

The solvent (C) may contain a good solvent $(C_2)$ wherein the solubility of the fluorinated polymer (A) is at least 30%, within a range to satisfy the condition (ii-2). The good solvent $(C_2)$ contained in the solvent (C) is preferably from 0 to 95 mass %, more preferably from 0 to 90 mass %.

As the good solvent $(C_2)$, HFC having at least six fluorine atoms may be mentioned. HFC having at least six fluorine atoms may, for example, be $C_4F_9C_2H_5$, $C_6F_{13}CH_2CH_3$, $C_8F_{17}C_2H_5$, $C_6F_{13}H$, $HC_6F_{12}H$, $HC_4F_8H$, $C_6F_{14}$, $C_7F_{16}$, $CF_3CFHCFHCF_2CF_3$ or $(CF_3)_2CFCFHCFHCF_3$, preferably either one or both of $C_6F_{13}H$ and $CF_3CFHCFHCF_2CF_3$ in view of availability. As the good solvent $(C_2)$, one type may be used alone, or at least two types may be used in combination.

Condition (ii-2):

If the degree of swelling of the fluorinated polymer (A) by the mixed solvent (BC) is less than 70%, at the time of mixing the solution or dispersion of the fluorinated polymer (A) with the solvent (C), a component having extremely high solubility, that is a component having high adhesion, is also likely to precipitate, whereby particles of the fluorinated polymer (A) adhere to each other to readily form a single large aggregate.

If the degree of swelling of the fluorinated polymer (A) by the mixed solvent (BC) exceeds 250%, a component having a relatively high solubility, that is a component which can readily aggregate the fluorinated polymer (A) hardly precipitate at the time of mixing the solution or dispersion of the fluorinated polymer (A) with the solvent (C), and therefore it is difficult to aggregate the fluorinated polymer (A), whereby a large amount of fine particles are formed.

The degree of swelling of the fluorinated polymer (A) by the mixed solvent (BC) is preferably from 80 to 250%, more preferably from 105 to 250%, for the above-mentioned reasons.

In a case where the fluorinated polymer (A) is the aftermentioned fluorinated polymer (A1), the degree of swelling of the fluorinated polymer (A1) by the solvent (BC) is particularly preferably from 70 to 200%, for the above-mentioned reasons.

In a case where the fluorinated polymer (A) is the aftermentioned fluorinated polymer (A2), the degree of swelling of the fluorinated polymer (A2) by the solvent (BC) is particularly preferably from 105 to 250%, for the above-mentioned reasons.

The degree of swelling of the fluorinated polymer (A) by the solvent (BC) can be adjusted by the following methods or a combination thereof.

A method wherein the solvent (C) is adjusted by a mixing ratio of at least two poor solvents (C1).

A method wherein the solvent (C) is adjusted by a mixing ratio of at least one type of the poor solvent (C1) and at least one type of the good solvent ($C_2$).

A method wherein the solvent (C) is adjusted by a temperature of the solvent (C) immediately before mixing it with solution or dispersion of the fluorinated polymer (A).

Condition (ii-3):

If the mass ratio ($W_C/W_B$) of the amount ($W_C$) of the solvent (C) to be used and the amount ($W_B$) of the solvent (B) to be used is less than 1, the amount of the solvent for aggregation tends to be too small, and the fluorinated polymer (A) tends to hardly aggregate in the step (ii). If $W_C/W_B$ exceeds 5, the fluorinated polymer (A) tends to rapidly aggregate in a short time, whereby fine particles are likely to be formed. Further, if it exceeds 5, the amount of the solvent (C) to be used becomes large, such being not efficient and hardly industrially acceptable as the amount of the solvent to be used for the fluorinated polymer (A).

$W_C/W_B$ is preferably from 1 to 3, more preferably from 1 to 2. For example, when the solvent (C) is prepared so that the degree of swelling of the fluorinated polymer (A) would be small, the amount of the solvent (C) to be used is decreased, whereby $W_C/W_B$ can be made to close to 1.

Degree of Swelling in Step (ii):

The degree of swelling of the fluorinated polymer (A) by each solvent will be an index for the affinity between each solvent and the fluorinated polymer (A). In a good solvent, the fluorinated polymer (A) is stably present in a state swelled or dissolved by the good solvent. When a poor solvent is added to such a state, the good solvent showing affinity with the fluorinated polymer (A) will decrease, and the fluorinated polymer (A) which has been in a swelled state, will shrink and gather for aggregation, or the fluorinated polymer (A) which has been in a dissolved state will precipitate and gather for aggregation.

In the present invention, by controlling the degree of swelling before and after the aggregation of the fluorinated polymer (A), it becomes possible to form particles of the fluorinated polymer (A) having little fine particles and large aggregates and being suitable for solid-liquid separation by e.g. filtration.

Temperature of Solvent (C) in Step (ii):

In the step (ii), the temperature of the solvent (C) immediately before mixing it with solution or dispersion of the fluorinated polymer (A) is preferably within a range of from −15 to 30° C. When the temperature of the solvent (C) is at least −15° C., it is possible to save energy for cooling the solvent (C) in the step (ii). When the temperature of the solvent (C) is at most 30° C., the fluorinated polymer (A) is likely to aggregate, and fine particles are less likely to be formed.

The temperature of the solvent (C) immediately before mixing it with solution or dispersion of the fluorinated polymer (A) is preferably from −10 to 25° C., more preferably from −5 to 25° C.

(Step (iii))

Fluid containing particles of the fluorinated polymer (A) is filtrated to separate and recover the particles of the fluorinated polymer (A). Further, as the case requires, an unreacted monomer is recovered from a filtrate. As the filtration method, a known filtration method such as pressurized filtration, vacuum filtration, normal filtration or centrifugal filtration may be employed.

The particles of the fluorinated polymer (A) recovered are washed with the poor solvent (C1), as the case requires.

The particles of the fluorinated polymer (A) recovered are dried by a known drying method such as hot air drying, vacuum drying, suction drying, infrared drying or air (nitrogen) blow drying, as the case requires.

(Fluorinated Polymer (A))

The fluorinated polymer (A) has either one or both of structural units (u1) derived from tetrafluoroethylene and structural units (u2) having no sulfonic acid type functional group and having a cyclic structure and fluorine atoms, structural units (u3) having a sulfonic acid type functional group, wherein the proportion of the structural units (u1) is from 0 to 82 mol % in all structural units (100 mol %) in the fluorinated polymer (A). The fluorinated polymer (A) may have structural units (u4) (provided that the structural units (u1) are excluded) having no sulfonic acid type functional group and no cyclic structure, as the case requires.

The proportion of the structural units (u1) in the fluorinated polymer (A), is at most 82 mol %, and therefore the fluorinated polymer (A) has high solubility in a good solvent. The production method of the present invention is a method directed to the fluorinated polymer (A) to which the production method disclosed in Patent Document 1 is not applicable due to high solubility in a good solvent.

As the fluorinated polymer (A), the following fluorinated polymer (A1) or the following fluorinated polymer (A2) may specifically be mentioned.

Fluorinated Polymer (A1):

The fluorinated polymer (A1) has a proportion of the structural units (u1) being from 35 to 82 mol % (preferably from 40 to 82 mol %), a proportion of the structural units (u2) being at least 0 mol % and less than 30 mol % (preferably from 0 to 25 mol %), and a proportion of the structural units (u3) being from 18 to 35 mol % (preferably from 18 to 30 mol %), in all structural units (100 mol %) in the fluorinated polymer (A).

When the proportion of the structural units (u1) is at least 35 mol %, e.g. the mechanical strength, the chemical durability, the hot water resistance, the drying and humidification cycle durability of the fluorinated polymer (A) would be good. When the proportion of the structural units (u1) is at most 82 mol %, the solubility in a good solvent will be high. Further, the properties imparted by structural units (u3) would not be impaired.

When the proportion of the structural units (u2) is less than 30 mol %, the properties imparted by the structural units (u1) and the structural units (u3) would not be impaired.

When the proportion of the structural units (u3) is at least 18 mol %, it is possible to obtain the fluorinated polymer (A) having high ion exchange capacity. When the proportion of the structural units (u3) is at most 35 mol %, the properties imparted by the structural units (u1) would not be impaired.

Fluorinated Polymer (A2):

The fluorinated polymer (A2) has a proportion of the structural units (u1) being from 0 to 60 mol % (preferably from 3 to 60 mol %), a proportion of the structural units (u2) being from 20 to 85 mol % (preferably from 30 to 85 mol %) and a proportion of the structural units (u3) being from 10 to 35 mol %, in all structural units (100 mol %) in the fluorinated polymer (A).

When the proportion of the structural units (u1) is at least 3 mol %, e.g. the mechanical strength, the chemical durability, the hot water resistance, the drying and humidification cycle durability of the fluorinated polymer (A) would be good. When the proportion of the structural units (u1) is at most 60 mol %, the solubility in a good solvent would be high. Further, the properties imparted by the structural units (u2) and the structural units (u3) would not be impaired.

When the proportion of the structural units (u2) is at least 20 mol %, the heat resistance of the fluorinated polymer (A) would be good. When the proportion of the structural units (u2) is at most 85 mol %, the properties imparted by the structural units (u1) and the structural units (u3) would not be impaired.

When the proportion of the structural units (u3) is at least 10 mol %, it is possible to obtain the fluorinated polymer (A) having a high ion exchange capacity. When the proportion of the structural units (u3) is at most 35 mol %, the properties imparted by the structural units (u1) and the structural units (u3) would not be impaired.

(Polymer (F))

The fluorinated polymer (A) is preferably a polymer (F) wherein the sulfonic acid type functional group is —SO$_2$F since the effects of the present invention are easily obtainable.

The polymer (F) may specifically be a polymer (F$_1$) wherein the sulfonic acid type functional group of the above-mentioned fluorinated polymer (A1) is —SO$_2$F or a polymer (F$_2$) wherein the sulfonic acid type functional group of the above-mentioned fluorinated polymer (A2) is —SO$_2$F.

The proportions of the respective structural units in the polymer (F$_1$) or the polymer (F$_2$) are the same as the proportions of the respective structural units in the above-mentioned fluorinated polymer (A1) or the above-mentioned fluorinated polymer (A2).

Now, the respective structural units in the polymer (F) as a preferred embodiment of the fluorinated polymer (A) will be described.

(Structural Units (u1))

The structural units (u1) are structural units derived from tetrafluoroethylene.

$$\mathrm{\{CF_2\!-\!CF_2\}} \qquad (u1)$$

The polymer (F) has the structural units (u1), whereby e.g. the mechanical strength, the chemical durability, the hot water resistance, the drying and humidification cycle durability of the polymer (F) and the after-mentioned polymer (H) would be good.

(Structural Units (u2))

The structural units (u2) are structural units having no sulfonic acid type functional group and having a cyclic structure and fluorine atoms.

The polymer (F) has the structural units (u2), whereby the heat resistance of the polymer (F) and the after-mentioned polymer (H) would be good.

The structural units (u2) are preferably one having all of hydrogen atoms bonded to carbon atoms substituted by fluorine atoms, in view of excellent chemical durability of the polymer (F) and the after-mentioned polymer (H).

As the cyclic structure, a fluorinated aliphatic ring is preferred. Some of carbon atoms constituting the fluorinated aliphatic ring may be substituted by oxygen atoms. The fluorinated aliphatic ring is preferably a 4-membered to 7-membered ring, and from the viewpoint that the effect of the present invention is sufficiently obtainable, it is more preferably a 5-membered ring.

The structural units (u2) having a 5-membered fluorinated aliphatic ring, may, for example, be the after-mentioned structural units (u21), structural units (u22), structural units (u23) or structural units (u24), and from the viewpoint that the effect of the present invention is sufficiently obtainable, the structural units (u2) are preferably the structural units (u22).

Structural Units (u21):

The structural units (u21) are units represented by the following formula:

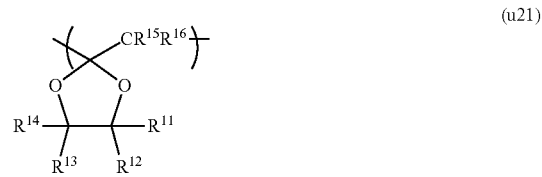

(u21)

wherein R$^{11}$ to R$^{16}$ which are independent of one another are a monovalent perfluoro organic group which may have an etheric oxygen atom or a fluorine atom. The organic group means a group containing at least one carbon atom.

The monovalent perfluoro organic group is preferably a perfluoroalkyl group. It is preferred that at least one of R$^{15}$ and R$^{16}$ is a fluorine atom, and it is more preferred that both of them are fluorine atoms from the viewpoint of high polymerization reactivity.

In a case where the perfluoroalkyl group has an etheric oxygen atom, the number of the oxygen atoms may be one or at least two. Further, the oxygen atom may be inserted between a carbon-carbon bond of the perfluoroalkyl group, or may be inserted to the terminal of a carbon atom bond. The perfluoroalkyl group may be linear or branched, and is preferably linear.

As the structural units (u21), structural units (u21-1) or structural units (u21-2) may be mentioned. Among them, structural units (u21-1) are preferred since preparation of the monomer (m21) is easy and the polymerization reactivity is high.

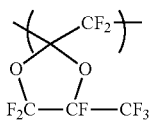
(u21-1)

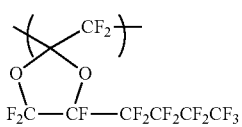
(u21-2)

In a case where the polymer (F) has the structural units (u21), the structural units (u21) may be one type or at least two types.

Structural Units (u22):

The structural units (u22) are units represented by the following formula:

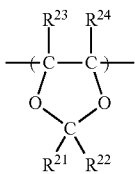
(u22)

wherein $R^{21}$ and $R^{22}$ which are independent of each other are a fluorine atom or a $C_{1-5}$ perfluoroalkylene group, and $R^{23}$ and $R^{24}$ which are independent of each other are a fluorine atom, a $C_{1-5}$ perfluoroalkylene group or a $C_{1-5}$ perfluoroalkoxy group.

The perfluoroalkyl group or the perfluoroalkoxy group may be linear or branched, and is preferably linear.

As the structural units (u22), the structural units (u22-1) to (u22-8) may be mentioned. Among them, structural units (u22-1) are preferred since preparation of the monomer (m22) is easy, the polymerization reactivity is high, and the effect of the present invention is sufficiently obtainable.

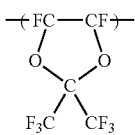
(u22-1)

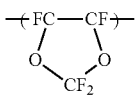
(u22-2)

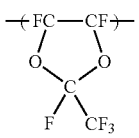
(u22-3)

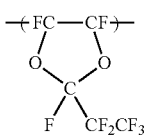
(u22-4)

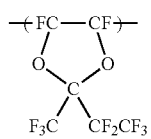
(u22-5)

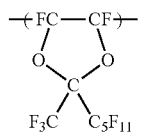
(u22-6)

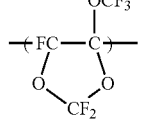
(u22-7)

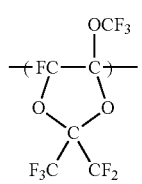
(u22-8)

In a case where the polymer (F) has the structural units (u22), the structural units (u22) may be only one type or at least two types.

Structural Units (u23):

The structural units (u23) are units represented by the following formula:

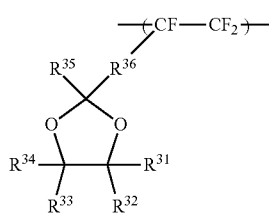
(u23)

wherein $R^{31}$ to $R^{35}$ which are independent of one another are a fluorine atom, a $C_{1-6}$ perfluoroalkyl group or a $C_{2-6}$ perfluoroalkyl group having an etheric oxygen atom between a carbon-carbon bond. $R^{36}$ is single bond, a $C_{1-6}$ perfluoroalkylene group or a $C_{2-6}$ perfluoroalkylene group having an etheric oxygen atom between a carbon-carbon bond.

In a case where each of $R^{31}$ to $R^{35}$ is a perfluoroalkyl group having an etheric oxygen atom, the number of the oxygen atoms may be one or at least two. The perfluoroalkyl group may be linear or branched, and is preferably linear.

In a case where $R^{36}$ is a perfluoroalkylene group having an etheric oxygen atom, the number of the oxygen atoms may be one or at least two. The perfluoroalkylene group may be linear or branched, and is preferably linear.

As the structural units (u23), the structural units (u23-1) and (u23-2) may be mentioned.

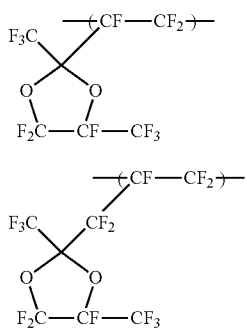

(u23-1)

(u23-2)

In a case where the polymer (F) has the structural units (u23), the structural units (u23) may be only one type or at least two types.

Structural Units (u24):

The structural units (u24) are units represented by the following formula:

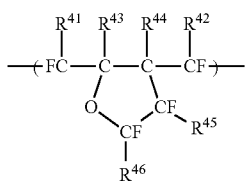

(u24)

$R^{41}$ to $R^{46}$ which are independent of one another are a monovalent perfluoro organic group which may have an etheric oxygen atom or a fluorine atom. As the monovalent perfluoro organic group, a perfluoroalkyl group is preferred.

In a case where the perfluoroalkyl group has an etheric oxygen atom, the number of the oxygen atoms may be one or at least two. Further, the oxygen atom may be inserted between a carbon-carbon bond of the perfluoroalkyl group, or may be inserted to the terminal of a carbon atom bond. The perfluoroalkyl group may be linear or branched, and is preferably linear. $R^{41}$ to $R^{44}$ are more preferably fluorine atoms from the viewpoint of high polymerization reactivity.

As the structural units (u24), structural units (u24-1) to (u24-3) may be mentioned. Among them, the structural units (u24-1) are preferred since preparation of the monomer (m24) is easy.

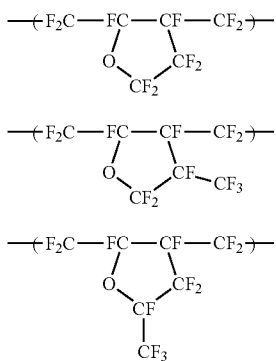

(u24-1)

(u24-2)

(u24-3)

In a case where the polymer (F) has the structural units (u24), the structural units (u24) may be only one type or at least two types.

Structural Units (u25):

Structural units (u2) other than the structural units (u21) to (u24) may be structural units (u25) derived from the after-mentioned perfluoromonomer (monomer (m25)) having at least two polymerizable carbon-carbon double bonds and further having 5-membered rings. When the polymer (F) has the structural units (u25), it is possible to increase a molecular weight of the polymer (F).

(Structural Units (u3)) The structural units (u3) are structural units having —$SO_2F$.

The polymer (F) has —$SO_2F$, whereby the proton conductivity can be imparted to the after-mentioned polymer (H).

The structural units (u3) are classified into structural units (u3a) having —$SO_2F$ and no cyclic structure and structural units (u3b) having —$SO_2F$ and a cyclic structure.

(Structural Units (u3a))

The structural units (u3a) are structural units having —$SO_2F$ and no cyclic structure. The structural units (u3a) are preferably such that all of hydrogen atoms bonded to carbon atoms are substituted by fluorine atoms, from the viewpoint of excellent chemical durability of the polymer (F).

As the structural units (u3a), the after-mentioned structural units (u3a1), structural units (u3a2) or structural units (u3a3) may, for example, be mentioned, and from the viewpoint that the effect of the present invention is sufficiently obtainable, the structural units (u3a2) are preferred.

Structural Units (u3a1):

Structural units (u3a1) are units represented by the following formula:

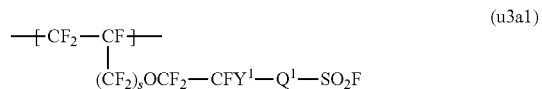

(u3a1)

wherein $Q^1$ is a single bond or a perfluoroalkylene group which may have an etheric oxygen atom, $Y^1$ is a fluorine atom or a monovalent perfluoro organic group, and s is 0 or 1. The single bond means that the carbon atom of $CFY^1$ and the sulfur atom of $SO_2$ are directly bonded to each other. The organic group means a group containing at least one carbon atom.

In a case where $Q^1$ is a perfluoroalkylene group having an etheric oxygen atom, the number of the oxygen atoms may be one or at least two. Further, the oxygen atom may be inserted between a carbon-carbon bond of the perfluoroalkylene group, or may be inserted to the terminal of a carbon atom bond.

The perfluoroalkylene group may be linear or branched.

The number of carbon atoms of the perfluoroalkylene group is preferably from 1 to 6, more preferably from 1 to 4. When the number of carbon atoms is at most 6, it is possible to suppress reduction of the ion exchange capacity of the after-mentioned polymer (H), and it is possible to suppress reduction of the proton conductivity.

$Y^1$ is preferably a fluorine atom or a trifluoromethyl group.

As the structural units (u3a1), structural units (u3a1-1) to (u3a1-4) are preferred since preparation of the monomer (m3a1) is easy and industrial implementation is easy.

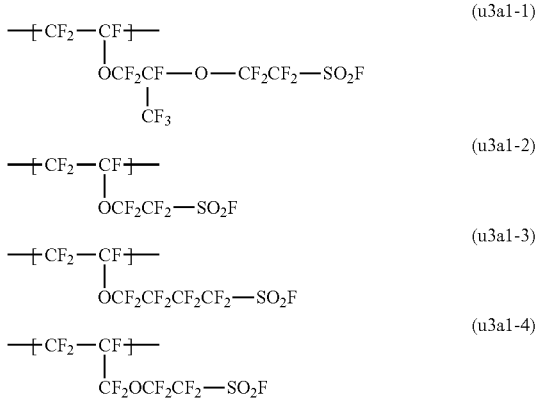

(u3a1-1)
(u3a1-2)
(u3a1-3)
(u3a1-4)

In a case where the polymer (F) has the structural units (u3a1), the structural units (u3a1) may be only one type or at least two types.

Structural Units (u3a2):

The structural units (u3a2) are units represented by the following formula:

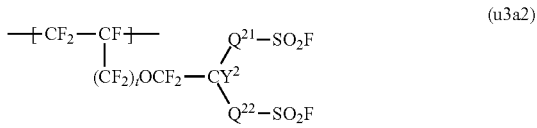

(u3a2)

wherein $Q^{21}$ is a perfluoroalkylene group which may have an etheric oxygen atom, $Q^{22}$ is a single bond or a perfluoroalkylene group which may have an etheric oxygen atom, $Y^2$ is a fluorine atom or a monovalent perfluoro organic group, and t is 0 or 1. The single bond means that the carbon atom of $CY^2$ and the sulfur atom of $SO_2$ are directly bonded to each other. The organic group means a group containing at least one carbon atom.

In a case where $Q^{21}$ or $Q^{22}$ is a perfluoroalkylene group having an etheric oxygen atom, the number of oxygen atoms may be one or at least two. Further, the oxygen atom may be inserted between a carbon-carbon bond of the perfluoroalkylene group, or may be inserted to the terminal of a carbon atom bond.

The perfluoroalkylene group may be linear or branched, and is preferably linear.

The number of carbon atoms in the perfluoroalkene group is preferably from 1 to 6, more preferably from 1 to 4. When the number of carbon atoms is at most 6, the boiling point of the raw material fluorinated monomer tends to be low, and purification by distillation will be easy. Further, when the number of carbon atoms is at most 6, an increase in the ion exchange capacity of the after-mentioned polymer (H) will be suppressed, and a decrease in the proton conductivity will be suppressed.

$Q^{22}$ is preferably a $C_{1-6}$ perfluoroalkylene group which may have an etheric oxygen atom. In a case where $Q^{22}$ is a $C_{1-6}$ perfluoroalkylene group which may have an etheric oxygen atom, the stability in power generation performance will be excellent when the polymer electrolyte fuel cell is operated over a long period of time, as compared with a case where $Q^{22}$ is a single bond.

It is preferred that at least one of $Q^{21}$ and $Q^{22}$ is a $C_{1-6}$ perfluoroalkylene group which has an etheric oxygen atom. A fluorinated monomer having a $C_{1-6}$ perfluoroalkylene group which has an etheric oxygen atom can be prepared without via a fluorination reaction by fluorine gas, whereby the yield is good, and the production is easy.

$Y^2$ is preferably a fluorine atom or a $C_{1-6}$ linear perfluoroalkyl group which may have an etheric oxygen atom.

As the structural units (u3a2), structural units (u3a2-1) to (u3a2-3) are preferred, since preparation of the monomer (m3a2) is easy and industrial implementation is easy. The structural units (u3a2-2) are more preferred from the viewpoint that the effect of the present invention is sufficiently obtainable.

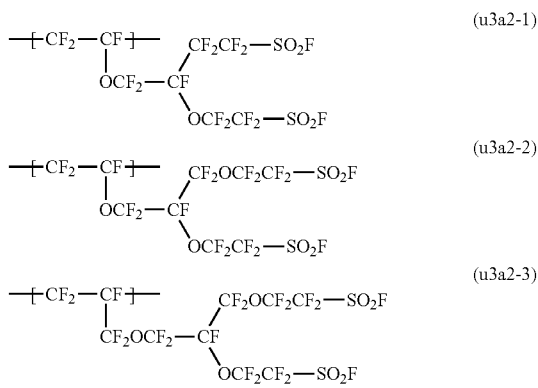

(u3a2-1)
(u3a2-2)
(u3a2-3)

In a case where the polymer (F) has the structural units (u3a2), the structural units (u3a2) may be one type or at least two types.

(Structural Units (u3b))

The structural units (u3b) are structural units having —$SO_2F$ and a cyclic structure. The structural units (u3b) are preferably such that all of hydrogen atoms bonded to carbon atoms are substituted by fluorine atoms, from the viewpoint of excellent chemical durability of the polymer (F).

The cyclic structure is preferably a fluorinated aliphatic ring. Some of carbon atoms constituting the fluorinated aliphatic ring may be substituted by oxygen atoms. The fluorinated aliphatic ring is preferably a 4-membered to 7-membered ring, and from the viewpoint that the effect of the present invention is sufficiently obtainable, it is more preferably a 5-membered ring.

As the structural units (u3b) having a 5-membered fluorinated aliphatic ring, the after-mentioned structural units (u3b1), structural units (u3b2) or structural units (u3b3) may be mentioned, and from the viewpoint that the effect of the present invention is sufficiently obtainable, structural units (u3b2) are preferred.

Structural Units (u3b1):

The structural units (u3b1) are units represented by the following formula:

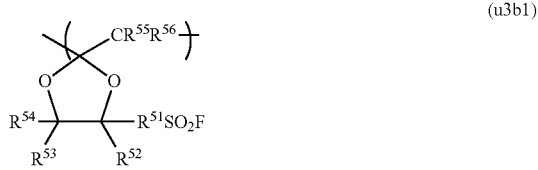

(u3b1)

wherein $R^{51}$ is a bivalent perfluoro organic group which may have an etheric oxygen atom, $R^{52}$, $R^{53}$, $R^{55}$ and $R^{56}$ which are independent of one another are monovalent perfluoro organic group which may have an etheric oxygen atom or a fluorine atom, and $R^{54}$ is a monovalent perfluoro organic group which may have an etheric oxygen atom, a fluorine atom or a —$R^{51}SO_2F$ group. The organic group means a group containing at least one carbon atom.

The bivalent perfluoro organic group as $R^{51}$ is preferably a perfluoroalkylene group. When the perfluoroalkylene group has an etheric oxygen atom, the number of the oxygen atoms may be one or more. Further, the oxygen atom may be inserted between a carbon-carbon bond of the perfluoroalkylene group, or may be inserted to the terminal of a carbon atom bond. The perfluoroalkylene group may be linear or branched and is preferably linear.

The monovalent perfluoro organic group as $R^{52}$, $R^{53}$, $R^{55}$ or $R^{56}$ is preferably a perfluoroalkyl group. It is preferred that at least one of $R^{55}$ and $R^{56}$ is a fluorine atom, and it is more preferred that both of them are fluorine atoms, in view of high polymerization reactivity.

The monovalent perfluoro organic group as $R^{54}$ is preferably a perfluoroalkyl group. In a case where the perfluoroalkyl group has an etheric oxygen atom, the number of the oxygen atoms may be one or at least two. Further, the oxygen atom may be inserted between a carbon-carbon bond of the perfluoroalkyl group, or may be inserted to the terminal of a carbon atom bond. The perfluoroalkyl group may be linear or branched and is preferably linear. When the structural units (u3b1) have two $R^{51}$ each $R^{51}$ may be the same or different.

As the structural units (u3b1), structural units (u3b1-1) to (u3b1-4) may be mentioned. The structural units (u3b1-1) are preferred since preparation of the monomer (m3b1) is easy, and industrial implementation is easy.

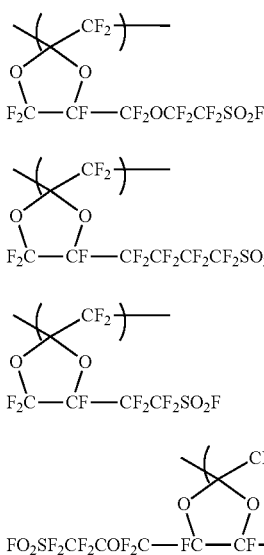

In a case where the polymer (F) has structural units (u3b1), the structural units (u3b1) may be only one type or at least two types.

Structural Units (u3b2):

The structural units (u3b2) are units represented by the following formula:

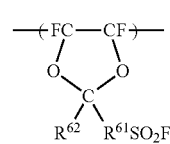

wherein $R^{61}$ is a $C_{1-6}$ perfluoroalkylene group or a $C_{2-6}$ perfluoroalkylene group having an etheric oxygen atom between a carbon-carbon bond, and $R^{62}$ is a fluorine atom, a $C_{1-6}$ perfluoroalkyl group, a $C_{2-6}$ perfluoroalkyl group having an etheric oxygen atom between a carbon-carbon bond, or a —$R^{61}SO_2F$ group. The organic group means a group containing at least one carbon atom.

In a case where $R^{61}$ is a perfluoroalkylene group having an etheric oxygen atom, the number of the oxygen atoms may be one or at least two. The perfluoroalkylene group may be linear or branched and is preferably linear.

In a case where $R^{62}$ is a perfluoroalkyl group having an etheric oxygen atom, the number of the oxygen atoms may be one or at least two. The perfluoroalkyl group may be linear or branched and is preferably linear. When the structural units (u3b2) have two $R^{61}$, each $R^{61}$ may be the same or different.

As the structural units (u3b2), structural units (u3b2-1) and (u3b2-2) may be mentioned.

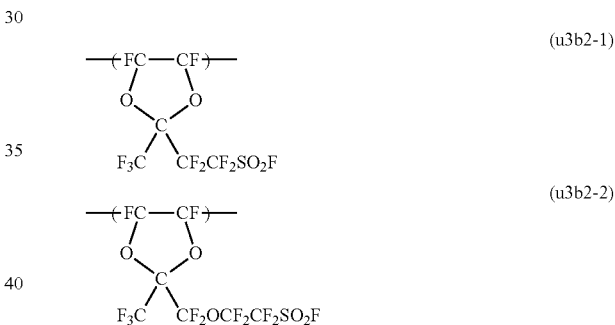

In a case where the polymer (F) has the structural units (u3b2), the structural units (u3b2) may be only one type or at least two types.

Structural Units (u3b3):

The structural units (u3b3) are units represented by the following formula:

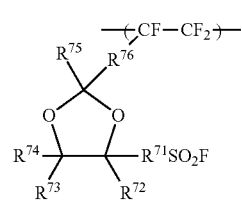

wherein $R^{71}$ is a $C_{1-6}$ perfluoroalkylene group or a $C_{2-6}$ perfluoroalkylene group having an etheric oxygen atom between a carbon-carbon bond, $R^{72}$ to $R^{75}$ which are independent of one another are a fluorine atom, a $C_{1-6}$ perfluoroalkyl group or a $C_{2-6}$ perfluoroalkyl group having an etheric oxygen atom between a carbon-carbon bond, and $R^{76}$ is a single bond, a $C_{1-6}$ perfluoroalkylene group or a $C_{2-6}$ perfluoroalkylene group having an etheric oxygen atom between a carbon-carbon bond. The organic group means a group containing at least one carbon atom.

In a case where $R^{71}$ is a perfluoroalkylene group having an etheric oxygen atom, the number of the oxygen atoms may be one or at least two. The perfluoroalkylene group may be linear or branched and is preferably linear.

In a case where each of $R^{72}$ to $R^{75}$ is a perfluoroalkyl group having an etheric oxygen atom, the number of the oxygen atoms may be one or at least two. The perfluoroalkyl group may be linear or branched and is preferably linear.

In a case where $R^{76}$ has a perfluoroalkylene group having an etheric oxygen atom, the number of the oxygen atoms may be one or at least two. The perfluoroalkylene group may be linear or branched and is preferably linear.

As the structural units (u3b3), structural units (u3b3-1) and (u3b3-2) may be mentioned.

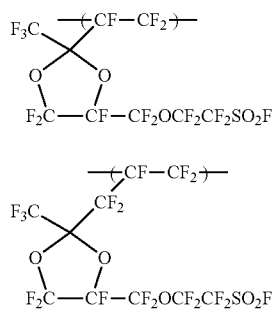

In a case where the polymer (F) has the structural units (u3b3), the structural units (u3b3) may be only one type or at least two types.

(Structural Units (u4))

The structural units (u4) are structural units (provided that the structural units (u1) are excluded) having no sulfonic acid group and no cyclic structure. The structural units (u4) are preferably such that all of hydrogen atoms bonded to carbon atoms are substituted by fluorine atoms, from the viewpoint that the polymer (F) is excellent in chemical durability.

The structural units (u4) may be structural units derived from a monomer (m4) other than the after-mentioned monomers (m1) to (m3).

(Method for Production of Polymer (F))

The polymer (F) may be produced by polymerizing monomers corresponding to the respective structural units in the desired polymer (F).

(Monomer (m1))

The monomer corresponding to the structural units (u1) is a monomer (m1), that is tetrafluoroethylene.

 (m1)

(Monomer (m21))

The monomer corresponding to the structural units (u21) is a monomer (m21).

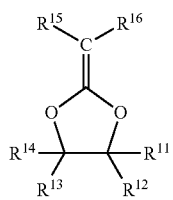

The monomer (m21) may be a monomer (m21-1) or (m21-2).

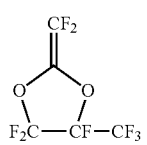

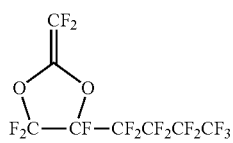

The monomer (m21) can be prepared by a method disclosed in WO2000/056694, Izvestiya Akademii Nauk SSSR, Seriya Khimicheskaya, 1989, vol. 4, p. 938 to 942, etc.

(Monomer (m22))

The monomer corresponding to the structural units (u22) is a monomer (m22).

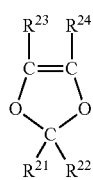

As the monomer (m22), monomers (m22-1) to (m22-8) may be mentioned.

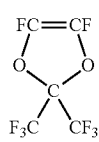

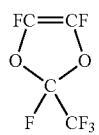

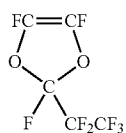
(m22-4)

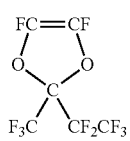
(m22-5)

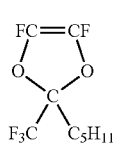
(m22-6)

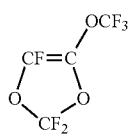
(m22-7)

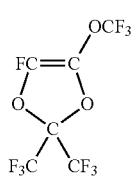
(m22-8)

The monomer (m22) can be prepared by a method disclosed in Macromolecule, vol. 26, number 22, 1993, p. 5829 to 5834, JP-A-6-92957, etc.

(Monomer (m23))

The monomer corresponding to the structural units (u23) is a monomer (m23).

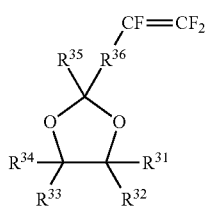
(m23)

As the monomer (m23), a monomer (m23-1) or (m23-2) may be mentioned.

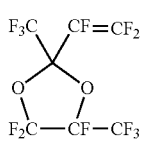
(m23-1)

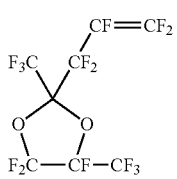
(m23-2)

The monomer (m23) can be prepared by a method disclosed in JP-A-2006-241302, etc.

(Monomer (m24))

The monomer corresponding to the structural units (u24) is a monomer (m24).

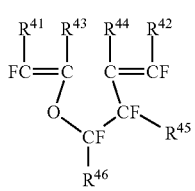
(m24)

As the monomer (m24), monomers (m24-1) to (m24-3) may be mentioned.

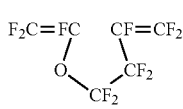
(m24-1)

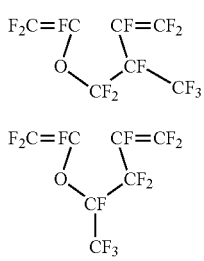

(m24-2)

(m24-3)

The monomer (m24) can be prepared by a method disclosed in Macromol. Symp., vol. 98, 1995, p. 753 to 767, etc.

(Monomer (m25))

The monomer corresponding to the structural units (u25) is a monomer (m25).

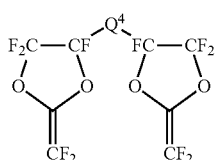
(m25)

$Q^4$ is a single bond, an oxygen atom or a $C_{1-10}$ perfluoroalkylene group which may have an etheric oxygen atom.

As the monomer (m25), monomers (m25-1) to (m25-6) may be mentioned.

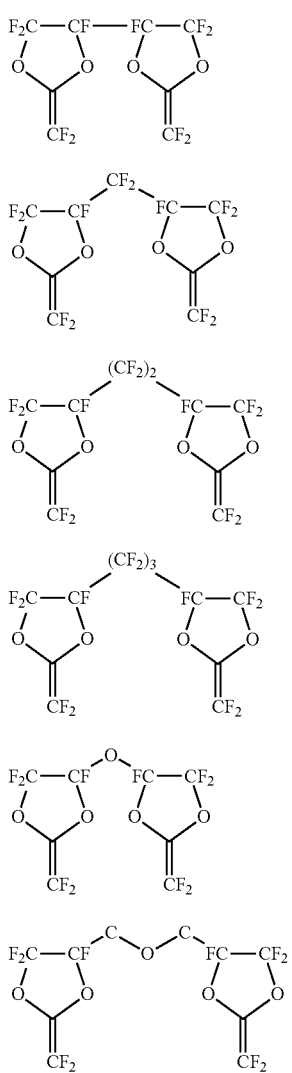

(m-25-1)

(m-25-2)

(m-25-3)

(m-25-4)

(m-25-5)

(m-25-6)

(Monomer (m3a1))

The monomer corresponding to the structural units (u3a1) is a monomer (m3a1).

$$CF_2=CF(CF_2)_3OCF_2-CFY^1-Q^1-SO_2F \quad (m3a1)$$

As the monomer (m3a1), monomers (m3a1-1) to (m3a1-4) are preferred.

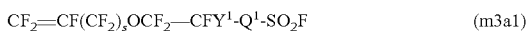

(m3a1-1)

$CF_2=CFOCF_2CF_2-SO_2F$ (m3a1-2)

$CF_2=CFOCF_2CF_2CF_2CF_2-SO_2F$ (m3a1-3)

$CF_2=CFCF_2OCF_2CF_2-SO_2F$ (m3a1-4)

The monomer (m3a1) can be produced, for example, by a known preparation method, such as a method disclosed by D. J. Vaugham, in "Du Pont Inovation", Vol. 43, No. 3, 1973, p. 10 or a method disclosed in Examples in U.S. Pat. No. 4,358,412.

(Monomer (m3a2))

The monomer corresponding to the structural units (u3a2) is a monomer (m3a2).

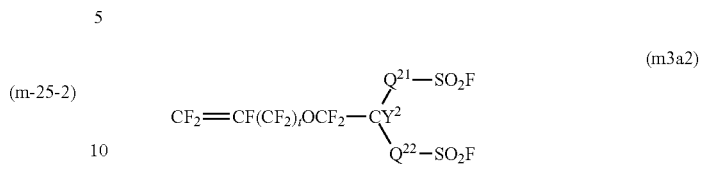

(m3a2)

As the monomer (m3a2), monomers (m3a2-1) to (m3a2-3) are preferred.

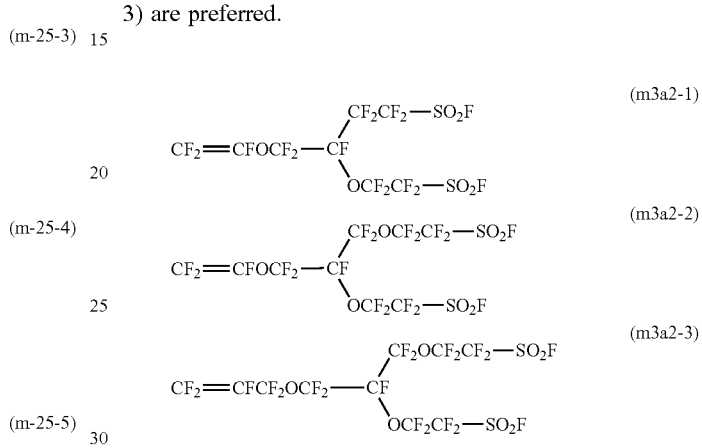

(m3a2-1)

(m3a2-2)

(m3a2-3)

The monomer (m3a2) can be produced by a known preparation method such as a method disclosed in WO2007/013533.

(Monomer (m3b1))

The monomer corresponding to the structural units (u3b1) is a monomer (m3b1).

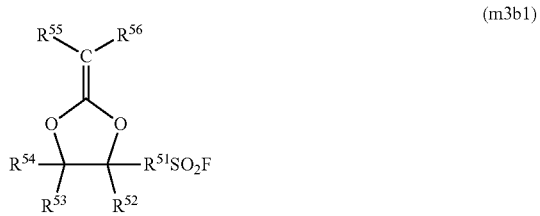

(m3b1)

As the monomer (m3b1), monomers (m3b1-1) to (m3b1-4) may be mentioned.

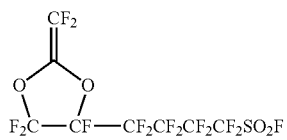

(m3b1-1)

(m3b1-2)

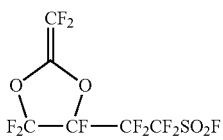
(m3b1-3)

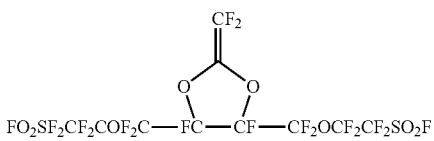
(m3b1-4)

The monomer (m3b1) can be prepared by a method disclosed in e.g. WO2003/037885, JP-A-2005-314388 or JP-A-2009-040909.

(Monomer (m3b2))

The monomer corresponding to the structural units (u3b2) is a monomer (m3b2).

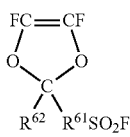
(m3b2)

As the monomer (m3b2), a monomer (m3b2-1) or (m3b2-2) may be mentioned.

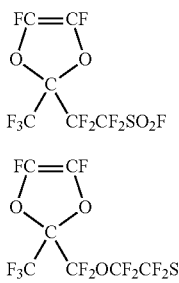
(m3b2-1)

(m3b2-2)

The monomer (m3b2) can be prepared by a method disclosed in e.g. JP-A-2006-152249.

(Monomer (m3b3))

The monomer corresponding to the structural units (u3b3) is a monomer (m3b3).

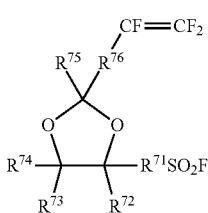
(m3b3)

As the monomer (m3b3), a monomer (m3b3-1) or (m3b3-2) may be mentioned.

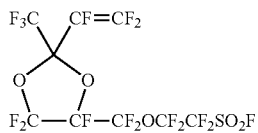
(m3b3-1)

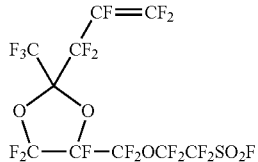
(m3b3-2)

The monomer (m3b3) can be prepared by a method disclosed in e.g. JP-A-2006-241302.

(Monomer (m4))

The monomer corresponding to the structural units (u4) is a monomer (m4) (provided that tetrafluoroethylene is excluded) having no sulfonic acid type functional group and no cyclic structure.

The monomer (m4) may, for example, be chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluorovinyl ether (such as perfluoro(alkyl vinyl ether), or perfluoro(alkyl vinyl ether containing an etheric oxygen atom).

(Polymerization Method)

As the polymerization method, a known polymerization method may be mentioned such as a bulk polymerization method, a solution polymerization method, a suspension polymerization method or an emulsion polymerization method. Otherwise, polymerization may be carried out in liquid or supercritical carbon dioxide.

The polymerization is carried out under a condition to form radicals. The method to form radicals may, for example, be a method of applying a radiation such as ultraviolet rays, γ-rays or electron beams, or a method of adding a radical polymerization initiator.

The polymerization temperature is usually from 10 to 150° C.

The radical polymerization initiator may, for example, be a bis(fluoroacyl) peroxide, a bis(chlorofluoroacyl) peroxide, a dialkyl peroxy dicarbonate, a diacyl peroxide, a peroxy ester, an azo compound or a persulfate. A perfluoro compound such as a bis(fluoroacyl) peroxide may be used from such a viewpoint that the polymer (F) substantially free from unstable terminal groups is thereby obtainable.

As a polymerization solvent to be used in the solution polymerization method, the above-mentioned good solvent (B2) is preferred.

In the solution polymerization method, monomers, a radical polymerization initiator, etc. are added to the solvent to let radicals form in the solvent thereby to carry out polymerization of the monomers. The monomer may be added all at once, sequentially or continuously.

(Post Processing)

After the step (iii), as the case requires, the polymer (F) recovered may be brought into contact with fluorine gas thereby to fluorinate an unstable terminal group of the polymer (F).

Further, after the step (iii), as the case requires, —SO$_2$F of the polymer (F) may be converted to an ion exchange groups such as sulfonic acid groups, sulfonimide groups or sulfonemethide groups by a known method thereby to obtain the polymer (H) having ion exchange groups.

The ion exchange capacity of the polymer (H) is preferably from 0.9 to 2.5 meq/g dry resin, more preferably from 1.0 to 2.2 meq/g dry resin. When the ion exchange capacity is at least 1.0 meq/g dry resin, the proton conductivity is likely to be high, whereby sufficient cell output can be obtained. When the ion exchange capacity is at most 2.2 meq/g dry resin, preparation of the polymer having a high molecular weight will be easy, and the polymer (H) will not be excessively swelled with water, and thus it is possible to maintain the mechanical strength.

EXAMPLES

Now, the present invention will be described in detail with reference to Examples, but it should be understood that the present invention is by no means restricted to such specific Examples. Further, Ex. 1 to 3, 6, 9 and 10 are Examples of the present invention, and Ex. 4, 5, 7 and 8 are Comparative Examples.

(Solubility)

(I) Particles of the polymer (F) obtained by drying after the step (iii) were heat-pressed to obtain a film having a thickness of 100 μm. From the film, a sample of 20 mm×20 mm was cut out, and a mass ($W_1$) of the sample was measured.

(II) In 50 g of the same simulated solvent as the poor solvent (B1) (AE3000) or the good solvent (B2) (C$_6$F$_{13}$H), the sample was immersed for 16 hours at 25° C. in a sealed environment.

(III) The sample was collected by filtration using a propylene filter with a sieve opening of 113 μm, and the filtrate was dried at 80° C. for 6 hours and vacuum-dried at 120° C. for 16 hours, whereupon the mass ($W_2$) of the sample was measured.

(IV) The solubility was obtained from the following formula (1).

Solubility (%)=$W_2/W_1$×100     (1)

(Residue)

Solution of the polymer (F) was filtrated through a SUS-made 200 mesh filter manufactured by TOKYO SCREEN CO., LTD., thereby to confirm whether the residue remains on the filter.

(Degree of Swelling)

(I) Particles of the polymer (F) obtained by drying after the step (iii) were heat-pressed to obtain a film having a thickness of 100 μm. From the film, a sample of 20 mm×20 mm was cut out, and a dry mass ($W_{A1}$) of the sample was measured.

(II) In 50 g of the same simulated solvent as the poor solvent (B1) (AE3000), the poor solvent (C1) (AE3000 or methanol) or the mixed solvent (BC), the sample was immersed for 16 hours at the temperature of the solvent (C) immediately before mixing it with the solution or dispersion of the fluorinated polymer (A) in the step (ii) and further in a sealed environment.

(III) The sample was taken out from the simulated solvent, and after quickly wiping off the simulated solvent, the mass ($W_{A2}$) of the swollen sample was measured.

(IV) The degree of swelling was obtained from the following formula (2).

Degree of swelling (%)=($W_{A2}-W_{A1}$)/$W_{A1}$×100     (2)

(Filterability)

In the step (iii), it was confirmed whether filtration can be carried out without any problems, and what problems arise when there are any problems in the filtration.

(TQ)

TQ (unit: ° C.) is an index for a molecular weight or a softening point of the polymer (F), and is a temperature at which the extrusion rate becomes 100 mm$^3$/sec., when the polymer (F) is subjected to melt-extrusion under an extrusion pressure condition of 2.94 MPa from a nozzle having a length of 1 mm and an inner diameter of 1 mm.

Using Flow tester CFT-500D (manufactured by Shimadzu Corporation), the extrusion rate of the polymer (F) was measured by changing a temperature, whereby TQ at which the extrusion rate became 100 mm$^3$/sec. was obtained.

(Ion Exchange Capacity)

–SO$_2$F groups in the polymer (F) subjected to vacuum heat treatment at 240° C. under –0.1 MPaG for 16 hours were hydrolyzed, then converted to acid-form so as to be sulfonic acid groups, whereby a polymer (H) having sulfonic acid groups was obtained.

Using a 0.35N sodium hydroxide solution, the polymer (H) was neutralized at 60° C. over a period of 40 hours, and unreacted sodium hydroxide was titrated with 0.1N hydrochloric acid thereby to obtain an ion exchange capacity.

In a case where monomers are at least three types, the composition was obtained by 19F-NMR, and an ion exchange capacity (AR) was calculated.

(Abbreviation)

PSVE: monomer (m3a1-1), BSVE-2E: monomer (m3a2-2), PDD: monomer (m22-1), TFE: monomer (m1) (tetrafluoroethylene).

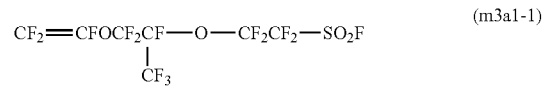

(m3a1-1)

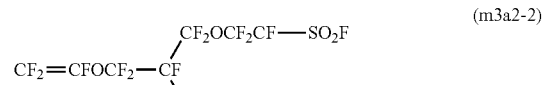

(m3a2-2)

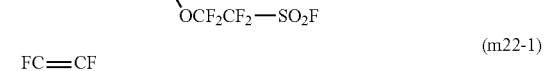

(m22-1)

(m-1)

C$_6$F$_{13}$H: CF$_3$CF$_2$CF$_2$CF$_2$CF$_2$CF$_2$H,

AE3000: CF$_3$CH$_2$OCF$_2$CF$_2$H (ASAHIKLIN (registered trade mark by Asahi Glass Company, Limited), V601: 2,2'-azobis(dimethyl isobutyrate) (V-601 manufactured by Wako Pure Chemical Industries, Ltd.), PFB: bis(heptafluorobutyryl)peroxide (PFB manufactured by NOF Corporation).

Ex. 1

Step (i): Into a 2,575 mL stainless steel autoclave, 1,959 g of PSVE was charged under reduced pressure of –0.1 MPaG while cooling it with ice water, followed by deaeration. As a solvent, 23.34 g of C$_6$F$_{13}$H was charged. The temperature was raised to 57° C., and then 0.109 MPa of nitrogen gas was introduced thereto. After confirming that the pressure did not change, TFE was introduced so that the total pressure would be 0.809 MPa (gage). 5.95 g of a 3.23 mass % solution of V601 dissolved in $C_6F_{13}H$, was added under pressure with nitrogen gas, and then the addition line was washed with 4 g of $C_6F_{13}H$. While maintaining the temperature and the pressure to be constant, TFE was continuously supplied. After 14 hours from the initiation of the polymerization, the autoclave was cooled to terminate the polymerization reaction, and the gas in the system was purged to obtain solution of a polymer (F-1). The solution was filtrated by a SUS-made 200 mesh filter, but no residue remained. The results are shown in Table 1.

Step (ii): The solution of the polymer (F-1) was kept at 25° C., and this solution was added to 5,000 g of AE3000 having a temperature of −7° C. thereby to aggregate the polymer (F-1), whereby particles of the polymer (F-1) were formed. The results are shown in Table 2.

Step (iii): A fluid containing particles of the polymer (F-1) was filtrated by a 4A filter paper (manufactured by Advantech Co., Ltd.). Particles of the polymer (F-1) separated and recovered were added to a mixed solvent of 720 g of AE3000 and 80 g of $C_6F_{13}H$, stirred, and then filtrated to wash the particles. The washing was repeated 5 times in total. The particles of the polymer (F-1) recovered were dried under reduced pressure of −0.1 MPaG at 80° C. overnight. The results are shown in Table 3.

Ex. 2

Step (i): Solution of a polymer (F-2) was obtained in the same manner as in Ex. 1 except that the amount to be charged and conditions were changed as shown in Table 1. The solution of the polymer (F-2) was diluted with 1,400 g of $C_6F_{13}H$ and 600 g of AE3000. The results are shown in Table 1.

Step (ii): The solution of the polymer (F-2) after the dilution was kept at 25° C., and this solution was added to 9,000 g of AE3000 having a temperature of 10° C., and the polymer (F-2) was aggregated to form particles of the polymer (F-2). The results are shown in Table 2.

Step (iii): Particles of the polymer (F-2) were recovered in the same manner as in the step (iii) in Ex. 1 except that the fluid containing the particles of the polymer (F-2) was used. The results are shown in Table 3.

Ex. 3

Step (i): Solution of a polymer (F-3) was obtained in the same manner as in Ex. 1 except that the amount to be charged and conditions were changed as shown in Table 1. The solution of the polymer (F-3) was diluted with 800 g of $C_6F_{13}H$. The results are shown in Table 1.

Step (ii): The solution of the polymer (F-3) after the dilution was kept at 25° C., this solution was added to a mixed solvent of 633 g of $C_6F_{13}H$ and 5,700 g of AE3000 having a temperature of 3° C., and the polymer (F-3) was aggregated to form particles of the polymer (F-3). The results are shown in Table 2.

Step (iii): Particles of the polymer (F-3) were recovered in the same manner as in the step (iii) in Ex. 1 except that fluid containing the particles of the polymer (F-3) was used. The results are shown in Table 3.

Ex. 4

Step (i): Solution of a polymer (F-4) was obtained in the same manner as in Ex. 3 except that the amount to be charge and conditions were changed as shown in Table 1. The solution of the polymer (F-4) was diluted with 800 g of $C_6F_{13}H$. The results are shown in Table 1.

Step (ii) and (iii): To 359 g of the solution of the polymer (F-4) after the dilution, 41 g of $C_6F_{13}H$ was added thereby to obtain 400 g of solution of the polymer (F-4). 400 g of the solution of the polymer (F-4) after the dilution was kept at 22° C., and this solution was added to 970 g of AE3000 having a temperature of −20° C. thereby to aggregate the polymer (F-4). The polymer (F-4) was formed into a single aggregate. The aggregate was pulverized, and then washing and drying were carried out in the same manner as in Ex. 1 except that the amount to be charged and the number of washing were changed as shown in Table 3. The results are shown in Tables 2 and 3.

Ex. 5

Step (i): From the solution of the polymer (F-4) obtained by the dilution with 800 g of $C_6F_{13}H$ in Ex. 4,365 g of the solution was mixed with 35 g of $C_6F_{13}H$ to obtain 400 g of solution of the polymer (F-4). The results are shown in Table 1.

Step (ii) and (iii): The solution of the polymer (F-4) after the dilution was kept at 21° C., and this solution was added to 945 g of AE3000 having a temperature of −13° C. thereby to aggregate the polymer (F-4). The polymer (F-4) was formed into a single aggregate. The washing and drying were carried out in the same manner as in Ex. 1 except that the amount to be charged and the number of washing were changed as shown in Table 3. The results are shown in Tables 2 and 3.

Ex. 6

Step (i): Into a 2,575 mL stainless steel autoclave, 1,053.6 g of BSVE-2E was charged and deaerated under reduced pressure of −0.1 MPaG while cooling it with ice water, and then 311.3 g of PDD was charged thereto. The temperature was raised to 24° C., and 0.1 MPa of nitrogen gas was introduced thereto. After confirming that the pressure did not change, 49.9 g of TFE was charged, and the total pressure was adjusted to 0.23 MPa (gauge). 13.38 g of 3.1 mass % solution of PFB dissolved in $C_6F_{13}H$ was added under pressure of nitrogen gas, and then addition line was washed with 4 g of $C_6F_{13}H$. After 24 hours from the initiation of polymerization, the autoclave was cooled to terminate the polymerization reaction, and the gas in the system was purged to obtain solution of a polymer (F-6). The solution of the polymer (F-6) was diluted with 1,600 g of $C_6F_{13}H$. The solution was filtrated by a SUS-made 200 mesh filter, but no residue remained. The results are shown in Table 1.

Step (ii): The solution of the polymer (F-6) after the dilution was kept at 25° C., and this solution was added to a mixed solvent of 1,246 g of methanol and 5,045 g of $C_6F_{13}H$ having a temperature of 20° C. whereby the polymer (F-6) was aggregated to form particles of the polymer (F-6). 3,850 g of fluid containing the particles of the polymer (F-6) was taken out, and 1,095 g of methanol was added thereto. The results are shown in Table 2.

Step (iii): The fluid containing the particles of the polymer (F-6) was filtrated by a 4A filter paper (manufactured by Advantech Co., Ltd.). The particles of the polymer (F-6) thus separated and recovered were added to a mixed solvent of 1,040 g of $C_6F_{13}H$ and 430 g of methanol, the resultant mixture was stirred, and then washed by filtration. The washing was repeated three times in total. The particles of

Ex. 7

Step (i): Solution of a polymer (F-7) was obtained in the same manner as in Ex. 6 except that the amount to be charged and conditions were changed as shown in Table 1. The solution of the polymer (F-7) was diluted with 1,600 g of $C_6F_{13}H$. The results are shown in Table 1.

Step (ii) and (iii): 200 g of the solution of the polymer (F-7) after the dilution was kept at 25° C., this solution was added to 50 g of methanol having a temperature of 20° C. thereby to aggregate the polymer (F-7). The polymer (F-7) was formed into a single aggregate. The aggregate was pulverized, and then washing and drying were carried out in the same manner as in Ex. 6 except that the amount to be charged was changed as shown in Table 3. The results are shown in Tables 2 and 3.

Ex. 8

Step (i): 200 g of a sample was collected from the solution of the polymer (F-7) obtained by the dilution with 1,600 g of $C_6F_{13}H$ in Ex. 7. The results are shown in Table 1.

Step (ii): Solution of the polymer (F-7) was kept at 25° C., and this solution was added to 500 g of AE3000 having a temperature of 25° C., whereby the polymer (F-7) was aggregated to form particles of the polymer (F-7). The results are shown in Table 2.

Step (iii): Solution containing the particles of the polymer (F-7) was filtrated by a 4A filter paper (manufactured by Advantech Co., Ltd.). Due to a large amount of fine particles, the filter was clogged, whereby it was impossible to conduct filtration in the middle. After the polymer particles were sedimented, a supernatant was removed and solid-liquid separation was carried out. Thereafter, washing and drying were carried out in the same manner as in Ex. 6 except that the amount to be charged was changed as shown in Table 3. The results are shown in Table 3.

Ex. 9

Step (i): Solution of a polymer (F-9) was obtained in the same manner as in Ex. 1 except that a 21,100 mL stainless steel autoclave was used, and that the monomer, the amount to be charge and conditions were changed as shown in Table 1. The solution of the polymer (F-9) was diluted with 9,670 g of $C_6F_{13}H$. The results are shown in Table 1.

Step (ii): The solution of the polymer (F-9) after the dilution was kept at 25° C., and this solution was added to 45,000 g of AE3000 having a temperature of 20° C., whereby the polymer (F-9) was aggregated to form particles of the polymer (F-9). The results are shown in Table 2.

Step (iii): Particles of the polymer (F-9) were recovered in the same manner as in the step (iii) in Ex. 1 except that solution containing the particles of the polymer (F-9) was used. The results are shown in Table 3.

Ex. 10

Step (i): 200 g of a sample was collected from the solution of the polymer (F-7) obtained by the dilution with 1,600 g of $C_6F_{13}H$ in Ex. 7. The results are shown in Table 1.

Step (ii): The solution of the polymer (F-7) was kept at 25° C., and this solution was added to a mixed solvent of 200 g of $CF_3CH_2OH$ and 20 g of $C_6F_{13}H$ having a temperature of 20° C., whereby the polymer (F-7) was aggregated to form particles of the polymer (F-7). The results are shown in Table 2.

Step (iii): The solution containing the particles of the polymer (F-7) was filtrated by a 4A filter paper (manufactured by Advantech Co., Ltd.). The particles of the polymer (F-7) thus separated and recovered were added to a mixed solvent of 60 g of $C_6F_{13}H$ and 90 g of $CF_3CH_2OH$, and the resultant mixture was stirred and then washed by filtration. The washing was repeated three times in total. The particles of the polymer (F-7) recovered were dried under reduced pressure of −0.1 MPaG overnight at 80° C. The results are shown in Table 3.

TABLE 1

| | Step (i) | | | Ex. 1 | Ex. 2 | Ex. 3 | Ex. 4 | Ex. 5 |
|---|---|---|---|---|---|---|---|---|
| Reactor capacity | | | mL | 2575 | 2575 | 2575 | 2575 | — |
| Monomer | (m3) | PSVE | g | 1959 | 1959 | 1741 | 1741 | — |
| | (m3) | BSVE-2E | g | — | — | — | — | — |
| | (m2) | PDD | g | — | — | — | — | — |
| | (m1) | TFE | g | (Continuously) | (Continuously) | (Continuously) | (Continuously) | — |
| Polymerization solvent | (B2) | $C_6F_{13}H$ | g | 23.34 | 23.34 | 20.75 | 20.75 | — |
| Radical initiator | | V601 | g | 0.192 | 0.659 | 0.585 | 0.585 | — |
| | | PFB | g | — | — | — | — | — |
| Dissolution solvent | (B2) | $C_6F_{13}H$ | g | 5.758 | 8.751 | 7.766 | 7.766 | — |
| Concentration | | | % | 3.23 | 7 | 7 | 7 | — |
| Amount of solution added | | | g | 5.95 | 9.41 | 8.35 | 8.35 | — |
| Washing solvent | (B2) | $C_6F_{13}H$ | g | 4 | 4 | 4 | 4 | — |
| Polymerization temperature | | | ° C. | 57 | 55 | 55 | 55 | — |
| Nitrogen gas pressure | | | MPa | 0.109 | 0.109 | 0.109 | 0.109 | — |
| Total pressure after introduction of TFE | | | MPa (gauge) | 0.809 | 0.804 | 0.804 | 0.804 | — |
| Polymerization time | | | hr | 14 | 20 | 20 | 20 | — |
| Dilution solvent | (B2) | $C_6F_{13}H$ | g | — | 1400 | 800 | 800 | — |
| | (B1) | AE3000 | g | — | 600 | — | — | — |
| Solubility (i-1) | (B2) | $C_6F_{13}H$ | % | 98 | 97 | 97 | 95 | 95 |
| | (B1) | AE3000 | % | — | 0.3 | — | — | — |
| Degree of swelling | (B1) | AE3000 | % | — | 39 | — | — | — |
| Residue (i-2) | | | — | Nil | Nil | Nil | Nil | Nil |

TABLE 1-continued

| Step (i) | | | | Ex. 6 | Ex. 7 | Ex. 8 | Ex. 9 | Ex. 10 |
|---|---|---|---|---|---|---|---|---|
| Reactor capacity | | | mL | 2575 | 2575 | — | 21100 | — |
| Monomer | (m3) | PSVE | g | — | — | — | — | — |
| | (m3) | BSVE-2E | g | 1053.6 | 1054 | — | 16357 | — |
| | (m2) | PDD | g | 311.3 | 311 | — | — | — |
| | (m1) | TFE | g | 49.9 | 50 | — | (Continuously) | — |
| Polymerization solvent | (B2) | $C_6F_{13}H$ | g | — | — | — | — | — |
| Radical initiator | | V601 | g | — | — | — | 3.290 | — |
| | | PFB | g | 0.415 | 0.415 | — | — | — |
| Dissolution solvent | (B2) | $C_6F_{13}H$ | g | 12.965 | 12.97 | — | 90.7 | — |
| Concentration | | | % | 3.1 | 3.1 | — | 3.5 | — |
| Amount of solution added | | | g | 13.38 | 13.38 | — | 94 | — |
| Washing solvent | (B2) | $C_6F_{13}H$ | g | 4 | 4 | — | 73 | — |
| Polymerization temperature | | | °C. | 24 | 24 | — | 57 | — |
| Nitrogen gas pressure | | | MPa | 0.1 | 0.1 | — | 0.15 | — |
| Total pressure after introduction of TFE | | | MPa (gauge) | 0.23 | 0.23 | — | 0.915 | — |
| Polymerization time | | | hr | 24 | 24 | — | 18 | — |
| Dilution solvent | (B2) | $C_6F_{13}H$ | g | 1600 | 1600 | — | 9670 | — |
| | (B1) | AE3000 | g | — | — | — | — | — |
| Solubility (i-1) | (B2) | $C_6F_{13}H$ | % | 99 | 99 | 99 | 99 | 99 |
| | (B1) | AE3000 | % | — | — | — | — | — |
| Degree of swelling | (B1) | AE3000 | % | — | — | — | — | — |
| Residue (i-2) | | | — | Nil | Nil | Nil | Nil | Nil |

TABLE 2

| Step (ii) | | | | Ex. 1 | Ex. 2 | Ex. 3 | Ex. 4 | Ex. 5 |
|---|---|---|---|---|---|---|---|---|
| Temperature of polymer (F) solution | | | °C. | 25 | 25 | 25 | 22 | 21 |
| Solvent (C) | (C1) | AE3000 | g | 5000 | 9000 | 5700 | 970 | 945 |
| | (C2) | $C_6F_{13}H$ | g | — | — | 633 | — | — |
| | (C1) | Methanol | g | — | — | — | — | — |
| | (C1) | $CF_3CH_2OH$ | g | — | — | — | — | — |
| Temperature of solvent (C) | | | °C. | −7 | 10 | 3 | −20 | −13 |
| Degree of swelling (ii-1) | (C1) | AE3000 | % | 30 | 39 | 35 | 25 | 27 |
| | (C1) | Methanol | % | — | — | — | — | — |
| | (C1) | $CF_3CH_2OH$ | % | — | — | — | — | — |
| Composition of mixed solvent (BC) | (m3) | PSVE | mass % | 26.8 | 13.4 | 17 | 18 | 18 |
| | (m3) | BSVE-2E | mass % | — | — | — | — | — |
| | (m2) | PDD | mass % | — | — | — | — | — |
| | (B2) + (C2) | $C_6F_{13}H$ | mass % | 0.5 | 11.3 | 17 | 10 | 9 |
| | (B1) + (C1) | AE3000 | mass % | 72.7 | 75.3 | 66 | 82 | 73 |
| | (C1) | Methanol | mass % | — | — | — | — | — |
| | (C1) | $CF_3CH_2OH$ | mass % | — | — | — | — | — |
| Degree of swelling (ii-2) of mixed solvent (BC) | | | % | 80 | 95 | 105 | 55 | 60 |
| $W_C/W_B$ (ii-3) | | | Mass ratio | 2.67 | 2.40 | 2.71 | 2.43 | 2.36 |
| Discharge amount | | | g | — | — | — | — | — |
| Additional solvent | (C2) | Methanol | g | — | — | — | — | — |
| Degree of swelling of mixed solvent (BC) after addition | | | % | — | — | — | — | — |

| Step (ii) | | | | Ex. 6 | Ex. 7 | Ex. 8 | Ex. 9 | Ex. 10 |
|---|---|---|---|---|---|---|---|---|
| Temperature of polymer (F) solution | | | °C. | 25 | 25 | 25 | 25 | 25 |
| Solvent (C) | (C1) | AE3000 | g | — | — | 500 | 45000 | — |
| | (C2) | $C_6F_{13}H$ | g | 5045 | — | — | — | 20 |
| | (C1) | Methanol | g | 1246 | 50 | — | — | — |
| | (C1) | $CF_3CH_2OH$ | g | — | — | — | — | 200 |
| Temperature of solvent (C) | | | °C. | 20 | 20 | 25 | 20 | 20 |
| Degree of swelling (ii-1) | (C1) | AE3000 | % | — | — | 270 | 65 | — |
| | (C1) | Methanol | % | 5 | 5 | — | — | — |
| | (C1) | $CF_3CH_2OH$ | % | — | — | — | — | 1 |
| Composition of mixed solvent (BC) | (m3) | PSVE | mass % | — | — | — | — | — |
| | (m3) | BSVE-2E | mass % | 10 | 27 | 9 | 21 | 16 |
| | (m2) | PDD | mass % | 0.5 | 1.3 | 0.4 | — | 0.8 |
| | (B2) + (C2) | $C_6F_{13}H$ | mass % | 75.5 | 49 | 16 | 14 | 29.2 |
| | (B1) + (C1) | AE3000 | mass % | — | — | 74.6 | 65 | — |
| | (C1) | Methanol | mass % | 14 | 22.7 | — | — | — |
| | (C1) | $CF_3CH_2OH$ | mass % | — | — | — | — | 54 |

TABLE 2-continued

| | | | | | | | |
|---|---|---|---|---|---|---|---|
| Degree of swelling (ii-2) of mixed solvent (BC) | | % | 200 | 60 | 450 | 140 | 120 |
| $W_C/W_B$ (ii-3) | | Mass ratio | 2.48 | 0.25 | 2.50 | 1.88 | 1.29 |
| Discharge amount | | g | 3850 | — | — | — | — |
| Additional solvent (C2) | Methanol | g | 1095 | — | — | — | — |
| Degree of swelling of mixed solvent (BC) after addition | | % | 110 | — | — | — | — |

TABLE 3

| Step (iii) | | | Ex. 1 | Ex. 2 | Ex. 3 | Ex. 4 | Ex. 5 |
|---|---|---|---|---|---|---|---|
| Filterability | | — | No problem | No problem | No problem | Single aggregate | Single aggregate |
| Washing solvent | AE3000 | g | 720 | 720 | 720 | 180 | 180 |
| | $C_6F_{13}H$ | g | 80 | 80 | 80 | 20 | 20 |
| | Methanol | g | — | — | — | — | — |
| | $CF_3CH_2OH$ | g | — | — | — | — | — |
| Number of washing | | Number | 5 | 5 | 5 | 3 | 3 |
| Yield of polymer (F) particles | | g | 183 | 400 | 380 | 44 | 45 |
| TQ | | °C. | 220 | 227 | 229 | 224 | 224 |
| Ion exchange capacity | | meq/g | 1.43 | 1.395 | 1.395 | 1.37 | 1.37 |
| Proportion of structural units of polymer (F) | (u3) PSVE | mol % | 28.3 | 27.0 | 27.0 | 26.1 | 26.1 |
| | (u3) BSVE-2E | mol % | — | — | — | — | — |
| | (u2) PDD | mol % | — | — | — | — | — |
| | (u1) TFE | mol % | 71.7 | 73.0 | 73.0 | 73.9 | 73.9 |
| Step (iii) | | | Ex. 6 | Ex. 7 | Ex. 8 | Ex. 9 | Ex. 10 |
| Filterability | | — | No problem | Single aggregate | Filter clogged | No problem | No problem |
| Washing solvent | AE3000 | g | — | — | — | 720 | — |
| | $C_6F_{13}H$ | g | 1040 | 1040 | 1040 | 80 | 60 |
| | Methanol | g | 430 | 430 | 430 | — | — |
| | $CF_3CH_2OH$ | g | — | — | — | — | 90 |
| Number of washing | | Number | 3 | 3 | 3 | 5 | 3 |
| Yield of polymer (F) particles | | g | 470 | 30 | 30 | 2650 | 30 |
| TQ | | °C. | 273 | 270 | 285 | 225 | 273 |
| Ion exchange capacity | | meq/g | 1.23 | 1.24 | 1.14 | 1.928 | 1.24 |
| Proportion of structural units of polymer (F) | (u3) PSVE | mol % | — | — | — | — | — |
| | (u3) BSVE-2E | mol % | 17.7 | 18 | 16 | 19.6 | 18 |
| | (u2) PDD | mol % | 66.7 | 67 | 67 | — | 67 |
| | (u1) TFE | mol % | 15.5 | 15 | 17 | 80.4 | 15 |

INDUSTRIAL APPLICABILITY

The fluorinated polymer particles obtained by the production method of the present invention are useful for known applications of fluorinated polymers. Particularly, particles of the polymer (F) are useful as a material for diaphragms (for alkali electrolysis, electrodialysis, various organic electrolytic syntheses, etc.), polymer electrolyte membranes (for fuel cells, ozone-forming electrolysis, water electrolysis, etc.), polymer catalysts (for organic syntheses, polymerization, etc.) and other membrane materials (for dehumidifiers, humidifying devices, etc.).

This application is a continuation of PCT Application No. PCT/JP2015/085560, filed on Dec. 18, 2015, which is based upon and claims the benefit of priority from Japanese Patent Application No. 2014-262599 filed on Dec. 25, 2014. The contents of those applications are incorporated herein by reference in their entireties.

What is claimed is:

1. A method for producing fluorinated polymer particles comprising the following (i) and (ii), being a method for producing particles of a fluorinated polymer (A) which has either one or both of structural units (u1) derived from tetrafluoroethylene and structural units (u2) having no sulfonic acid type functional group and having a cyclic structure and fluorine atoms, and which has structural units (u3) having a sulfonic acid type functional group, wherein the proportion of the structural units (u1) is from 0 to 82 mol % in all structural units (100 mol %) in the fluorinated polymer (A), the method comprising:
(i) preparing a solution or dispersion of the fluorinated polymer (A) having the above fluorinated polymer (A) dissolved or dispersed in a solvent (B), wherein the following conditions (i-1) and (i-2) are satisfied:
  (i-1) the solvent (B) comprises a solvent (B2) wherein the solubility of the fluorinated polymer (A) is at least 30%, and
  (i-2) even when the above solution or dispersion of the fluorinated polymer (A) is passed through a filter of 200 mesh made of stainless steel, no residue remains on the filter; and
(ii) mixing the solution or dispersion of the fluorinated polymer (A) and a solvent (C) to aggregate the fluorinated polymer (A) to form particles of the fluorinated polymer (A), wherein the following conditions (ii-1) to (ii-3) are satisfied:
  (ii-1) the solvent (C) comprises a solvent (C1) whereby the degree of swelling of the fluorinated polymer (A) is at most 100%,
  (ii-2) the degree of swelling of the fluorinated polymer (A) by a mixed solvent (BC) of the solvent (B) and the solvent (C) is from 70 to 250%, and
  (ii-3) the ratio ($W_C/W_B$) of the mass ($W_C$) of the solvent (C) to the mass ($W_B$) of the solvent (B) is from 1 to 5.

2. The method for producing fluorinated polymer particles according to claim 1, wherein the degree of swelling of the fluorinated polymer (A) by the solvent (BC) is from 80 to 250%.

3. The method for producing fluorinated polymer particles according to claim 1, wherein the degree of swelling of the fluorinated polymer (A) by the solvent (BC) is from 105 to 250%.

4. The method for producing fluorinated polymer particles according to claim 1, wherein the solvent (B2) is a hydrofluorocarbon.

5. The method for producing fluorinated polymer particles according to claim 1, wherein the solvent (B2) is either one or both of $C_6F_{13}H$ and $CF_3CFHCFHCF_2CF_3$.

6. The method for producing fluorinated polymer particles according to claim 1, wherein the solvent (C1) is at least one selected from the group consisting of hydrofluoroethers, hydrofluorocarbons, non-fluorinated alcohols, hydrocarbons and fluorinated alcohols.

7. The method for producing fluorinated polymer particles according to claim 1, wherein the solvent (C1) is at least one selected from the group consisting of $CF_3CH_2OCF_2CF_2H$, $CHF_2CH_2CF_3$, $CF_3CH_2CF_2CH_3$, methanol, hexane, $CF_3CF_2CH_2OH$, $CF_3CH_2OH$ and $H(CF_2)_4CH_2OH$.

8. The method for producing fluorinated polymer particles according to claim 1, wherein the solvent (C1) is at least two selected from the group consisting of hydrofluoroethers, hydrofluorocarbons, non-fluorinated alcohols, hydrocarbons and fluorinated alcohols.

9. The method for producing fluorinated polymer particles according to claim 1, wherein the degree of swelling of the fluorinated polymer (A) by the solvent (BC), is adjusted by the mixing ratio of at least two of the solvent (C1).

10. The method for producing fluorinated polymer particles according to claim 1, wherein the degree of swelling of the fluorinated polymer (A) by the solvent (BC), is adjusted by the temperature of the solvent (C) immediately before mixing it with the solution or dispersion of the fluorinated polymer (A) in the (ii) mixing.

11. The method for producing fluorinated polymer particles according to claim 1, wherein the temperature of the solvent (C) immediately before mixing it with the solution or dispersion of the fluorinated polymer (A) in the (ii) mixing is within a range of from −15 to 30° C.

12. The method for producing fluorinated polymer particles according to claim 1, wherein in all structural units (100 mol %) in the fluorinated polymer (A), the proportion of the structural units (u1) is from 35 to 82 mol %, the proportion of the structural units (u2) is at least 0 mol % and less than 30 mol %, and the proportion of the structural units (u3) is from 18 to 35 mol %.

13. The method for producing fluorinated polymer particles according to claim 12, wherein the degree of swelling of the fluorinated polymer (A) by the solvent (BC) is from 70 to 200%.

14. The method for producing fluorinated polymer particles according to claim 1, wherein in all structural units (100 mol %) in the fluorinated polymer (A), the proportion of the structural units (u1) is from 0 to 60 mol %, the proportion of the structural units (u2) is from 20 to 85 mol %, and the proportion of the structural units (u3) is from 10 to 35 mol %.

15. The method for producing fluorinated polymer particles according to claim 14, wherein the degree of swelling of the fluorinated polymer (A) by the solvent (BC) is from 105 to 250%.

16. The method for producing fluorinated polymer particles according to claim 1, wherein following the (i) preparing and (ii) mixing, the fluorinated polymer (A) is separated and recovered.

17. The method for producing fluorinated polymer particles according to claim 1, wherein the ion-exchange capacity of a polymer having the sulfonic acid type functional groups of the fluorinated polymer (A) converted to ion exchange groups, is from 0.9 to 2.5 meq/g dry resin.

* * * * *